US012206149B2

(12) United States Patent
Kikuda

(10) Patent No.: US 12,206,149 B2
(45) Date of Patent: Jan. 21, 2025

(54) DIELECTRIC WAVEGUIDE RESONATOR AND FILTER INCLUDING AT LEAST ONE INTERNAL CONDUCTOR PHYSICALLY ISOLATED FROM FIRST AND SECOND SURFACE CONDUCTORS AND OVERLAPPING THEREWITH

(71) Applicant: Murata Manufacturing Co., Ltd., Nagaokakyo (JP)

(72) Inventor: Masayuki Kikuda, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 316 days.

(21) Appl. No.: 17/825,022

(22) Filed: May 26, 2022

(65) Prior Publication Data

US 2022/0285809 A1 Sep. 8, 2022

Related U.S. Application Data

(63) Continuation of application No. PCT/JP2020/039854, filed on Oct. 23, 2020.

(30) Foreign Application Priority Data

Dec. 9, 2019 (JP) ................................ 2019-222124

(51) Int. Cl.
*H01P 1/208* (2006.01)
*H01P 3/12* (2006.01)
(Continued)

(52) U.S. Cl.
CPC .......... *H01P 1/2088* (2013.01); *H01P 1/2084* (2013.01); *H01P 3/12* (2013.01); *H01P 7/10* (2013.01); *H01P 7/082* (2013.01)

(58) Field of Classification Search
CPC ......... H01P 1/2088; H01P 7/065; H01P 5/103
(Continued)

(56) References Cited

U.S. PATENT DOCUMENTS 5,608,363 A 3/1997 Cameron et al.
5,731,751 A * 3/1998 Vangala .................. H01P 1/208 333/219.1

(Continued)

FOREIGN PATENT DOCUMENTS

CN 1628396 A 6/2005
CN 102683771 A 9/2012

(Continued)

OTHER PUBLICATIONS

International Search Report in PCT/JP2020/039854, mailed Dec. 22, 2020, 3 pages.

(Continued)

*Primary Examiner* — Benny T Lee
(74) *Attorney, Agent, or Firm* — Keating & Bennett, LLP

(57) ABSTRACT

A dielectric waveguide filter includes a dielectric plate including first and second principal surfaces facing each other and a side surface connecting outer edges of the first and second principal surfaces, a first surface conductor at the first principal surface, a second surface conductor at the second principal surface, a side conductor film inside the dielectric plate and connecting the first and second surface conductors, and an internal conductor extending in a perpendicular direction to the first principal surface and electrically connected to neither the first surface conductor nor the second surface conductor. Dielectric waveguide resonant spaces are surrounded by the first surface conductor, the second surface conductor, and the side conductor film.

18 Claims, 16 Drawing Sheets

(51) Int. Cl.
*H01P 7/10* (2006.01)
*H01P 7/08* (2006.01)

(58) Field of Classification Search
USPC .......................................................... 333/208
See application file for complete search history.

(56) References Cited

U.S. PATENT DOCUMENTS

| | | | | |
|---|---|---|---|---|
| 5,926,079 | A * | 7/1999 | Heine et al. | H01P 1/2088 333/208 |
| 2005/0156688 | A1 | 7/2005 | Ito et al. | |
| 2012/0169435 | A1 | 7/2012 | Kaneda et al. | |
| 2012/0229233 | A1 | 9/2012 | Ito | |
| 2013/0154759 | A1 * | 6/2013 | Morita et al. | H01P 5/107 333/34 |
| 2019/0199313 | A1 | 6/2019 | Ashida et al. | |

FOREIGN PATENT DOCUMENTS

| | | | |
|---|---|---|---|
| CN | 110034359 | A | 7/2019 |
| JP | 2000082903 | A | 3/2000 |
| JP | 2003229703 | A | 8/2003 |
| JP | 2008098727 | A | 4/2008 |
| JP | 2018125717 | A | 8/2018 |
| WO | 1995027317 | A2 | 10/1995 |
| WO | 2003067701 | A1 | 8/2003 |

OTHER PUBLICATIONS

Written Opinion in PCT/JP2020/039854, mailed Dec. 22, 2020, 3 pages.

Office Action in CN202080083366.3, mailed Oct. 20, 2023, 17 pages.

* cited by examiner

DIELECTRIC WAVEGUIDE RESONATOR AND FILTER INCLUDING AT LEAST ONE INTERNAL CONDUCTOR PHYSICALLY ISOLATED FROM FIRST AND SECOND SURFACE CONDUCTORS AND OVERLAPPING THEREWITH

CROSS REFERENCE TO RELATED APPLICATIONS

This application claims the benefit of priority to Japanese Patent Application No. 2019-222124 filed on Dec. 9, 2019 and is a Continuation Application of PCT Application No. PCT/JP2020/039854 filed on Oct. 23, 2020. The entire contents of each application are hereby incorporated herein by reference.

BACKGROUND OF THE INVENTION

1. Field of the Invention

The present invention relates to a dielectric waveguide resonator and a dielectric waveguide filter including the dielectric waveguide resonator.

2. Description of the Related Art

Along with an increase in speed and capacity of mobile communication, the millimeter waveband is more frequently being used. As a filter used at, for example, a base station for mobile communication using the millimeter waveband, a dielectric waveguide filter is suitable.

As a dielectric waveguide filter used in the millimeter waveband or the like, for example, Japanese Unexamined Patent Application Publication No. 2018-125717 is disclosed. The dielectric waveguide filter includes a dielectric waveguide resonator in which a first conductor layer and a second conductor layer are respectively formed on a first surface and a second surface of a dielectric plate, the first surface and the second surface facing each other, and a post wall is formed using a large number of via conductors connecting the conductor layers at both the surfaces.

Japanese Unexamined Patent Application Publication No. 2018-125717 also shows that a resonant frequency of the dielectric waveguide resonator is adjusted by causing a blind via having a via conductor formed therein to protrude from the first surface in an inward direction and connecting the conductor layer and the via conductor by a metal wiring portion.

SUMMARY OF THE INVENTION

Generally, since a dielectric material which is low in dielectric loss can be used for a dielectric waveguide resonator and a conductor portion is basically composed of a conductor extending in a planar form, conductor loss can be kept low.

In the dielectric waveguide filter illustrated in Japanese Unexamined Patent Application Publication No. 2018-125717, however, since electric field strength between a distal end of the via conductor formed in the blind via inside the dielectric substrate and the conductor layer which the distal end faces is high and currents concentrate at a distal end portion of the via conductor, a relatively large resistance loss occurs in the portion with a high current density. That is, a dielectric waveguide resonator having a high Q factor is hard to obtain, which leads to the problem of the difficulty in obtaining a dielectric waveguide filter having a low insertion loss.

Preferred embodiments of the present invention provide dielectric waveguide resonators each including a structure for resonant frequency adjustment and having a high Q factor and a dielectric waveguide filter having a low insertion loss.

A dielectric waveguide resonator as an example of a preferred embodiment of the present disclosure includes a dielectric plate including a first principal surface and a second principal surface facing each other and a side surface connecting an outer edge of the first principal surface and an outer edge of the second principal surface, a first surface conductor at the first principal surface, a second surface conductor at the second principal surface, a connection conductor inside the dielectric plate and connecting the first surface conductor and the second surface conductor, and an internal conductor extending in a perpendicular direction to the first principal surface and electrically connected to neither the first surface conductor nor the second surface conductor. The dielectric waveguide resonator includes a dielectric waveguide resonant space which is surrounded by the first surface conductor, the second surface conductor, and the connection conductor.

According to the dielectric waveguide resonator with the above-described configuration, since the internal conductor is isolated from the first surface conductor and the second surface conductor, that is, the internal conductor is floating galvanically from potentials of the first surface conductor and the second surface conductor, the degree of concentration of currents at an end portion of the internal conductor is low. For this reason, a dielectric waveguide resonator including a resonant frequency adjustment structure and having a high Q factor is obtained.

Further, a dielectric waveguide filter as an example of a preferred embodiment of the present disclosure includes a dielectric waveguide resonator. The dielectric waveguide resonator includes a dielectric plate which includes a first principal surface and a second principal surface facing each other and a side surface connecting an outer edge of the first principal surface and an outer edge of the second principal surface, a first surface conductor at the first principal surface, a second surface conductor at the second principal surface, and a connection conductor inside the dielectric plate and connecting the first surface conductor and the second surface conductor. The dielectric waveguide filter further includes an internal conductor inside the dielectric waveguide resonator, extending in a perpendicular direction to the first principal surface, and electrically connected to neither the first surface conductor nor the second surface conductor.

Further, a dielectric waveguide filter as an example of a preferred embodiment of the present disclosure includes a plurality of dielectric waveguide resonators and a main coupling portion to couple adjacent dielectric waveguide resonators of the plurality of dielectric waveguide resonators. Each of the plurality of dielectric waveguide resonators includes a dielectric plate including a first principal surface and a second principal surface facing each other and a side surface connecting an outer edge of the first principal surface and an outer edge of the second principal surface, a first surface conductor at the first principal surface, a second surface conductor at the second principal surface, and a connection conductor inside the dielectric plate and connecting the first surface conductor and the second surface conductor. Each of one, some, or all of the plurality of dielectric waveguide resonators further includes a respective internal conductor inside the corresponding dielectric waveguide resonator, extends in a perpendicular direction to the first principal surface, and is electrically connected to neither the first surface conductor nor the second surface conductor.

The dielectric waveguide filters with the above-described configurations each include a dielectric waveguide resonator in which the degree of concentration of currents at an internal conductor is low and which has a high Q factor, as described above. Thus, a dielectric waveguide filter having a low insertion loss is obtained.

According to preferred embodiments of the present invention, dielectric waveguide resonators each including a structure for resonant frequency adjustment and having a high Q factor and a dielectric waveguide filter having a low insertion loss are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
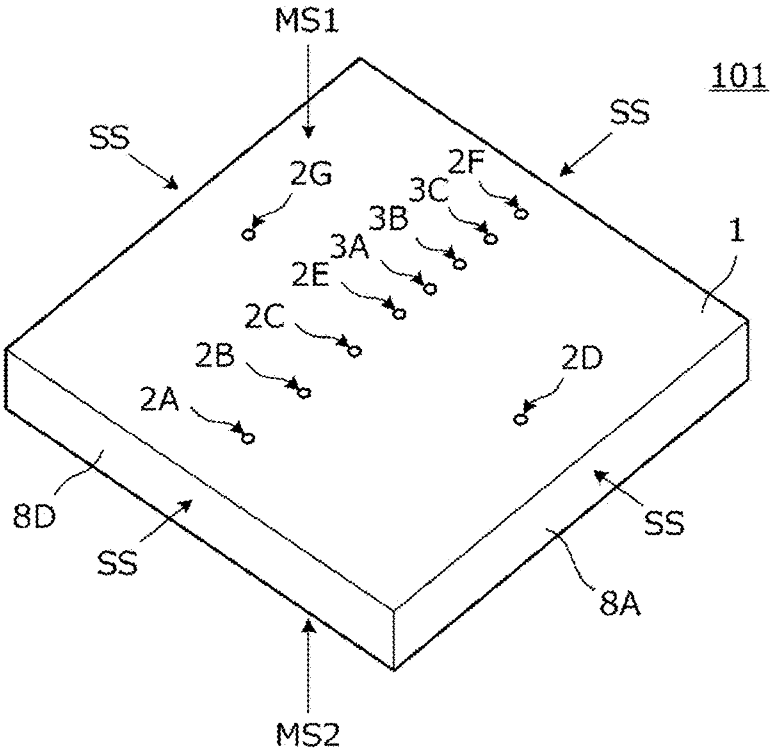
FIG. 1A is an external perspective view of a dielectric waveguide filter according to a first preferred embodiment of the present invention.

Hereinafter, preferred embodiments of the present invention will be illustrated with several specific examples with reference to the drawings. The same components are denoted by the same reference characters in the detailed description of the drawings. Although preferred embodiments are separately illustrated for convenience in view of description of points or ease of understanding, partial replacement or combination of configurations illustrated in different preferred embodiments is possible. In second and subsequent preferred embodiments, a description of matters in common with the first preferred embodiment will be omitted, and only differences will be described. In particular, the same operational effects by the same configurations will not be mentioned one by one in each preferred embodiment.

First Preferred Embodiment

Figure 1B:
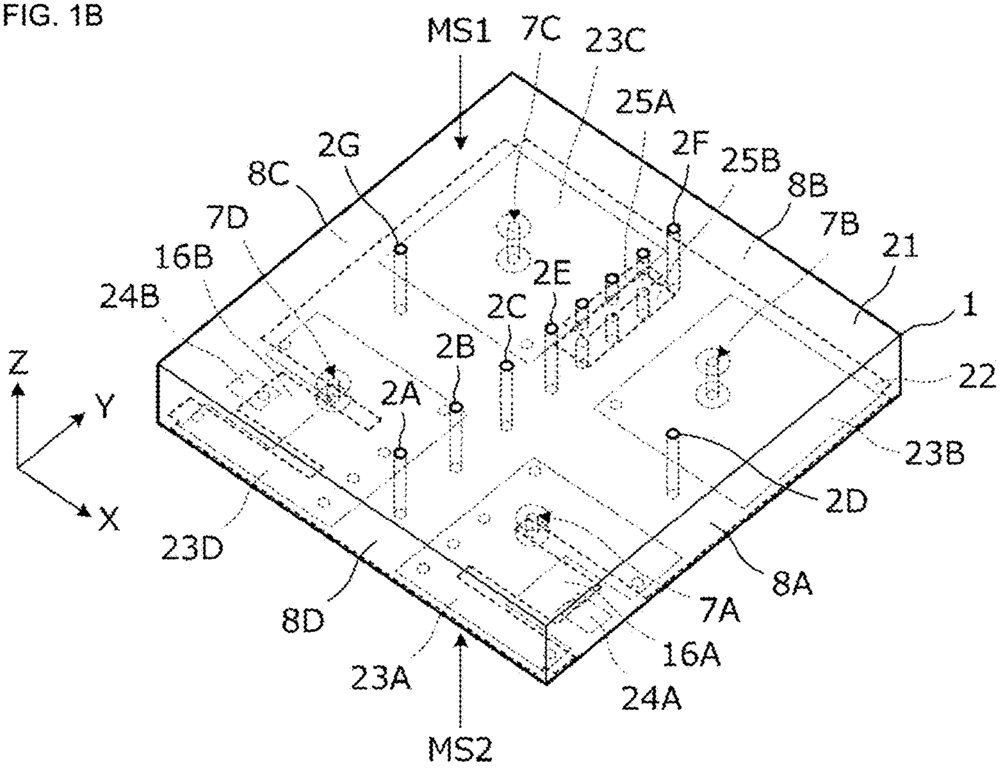
FIG. 1B is a perspective view showing an internal structure of the dielectric waveguide filter.
Figure 2:
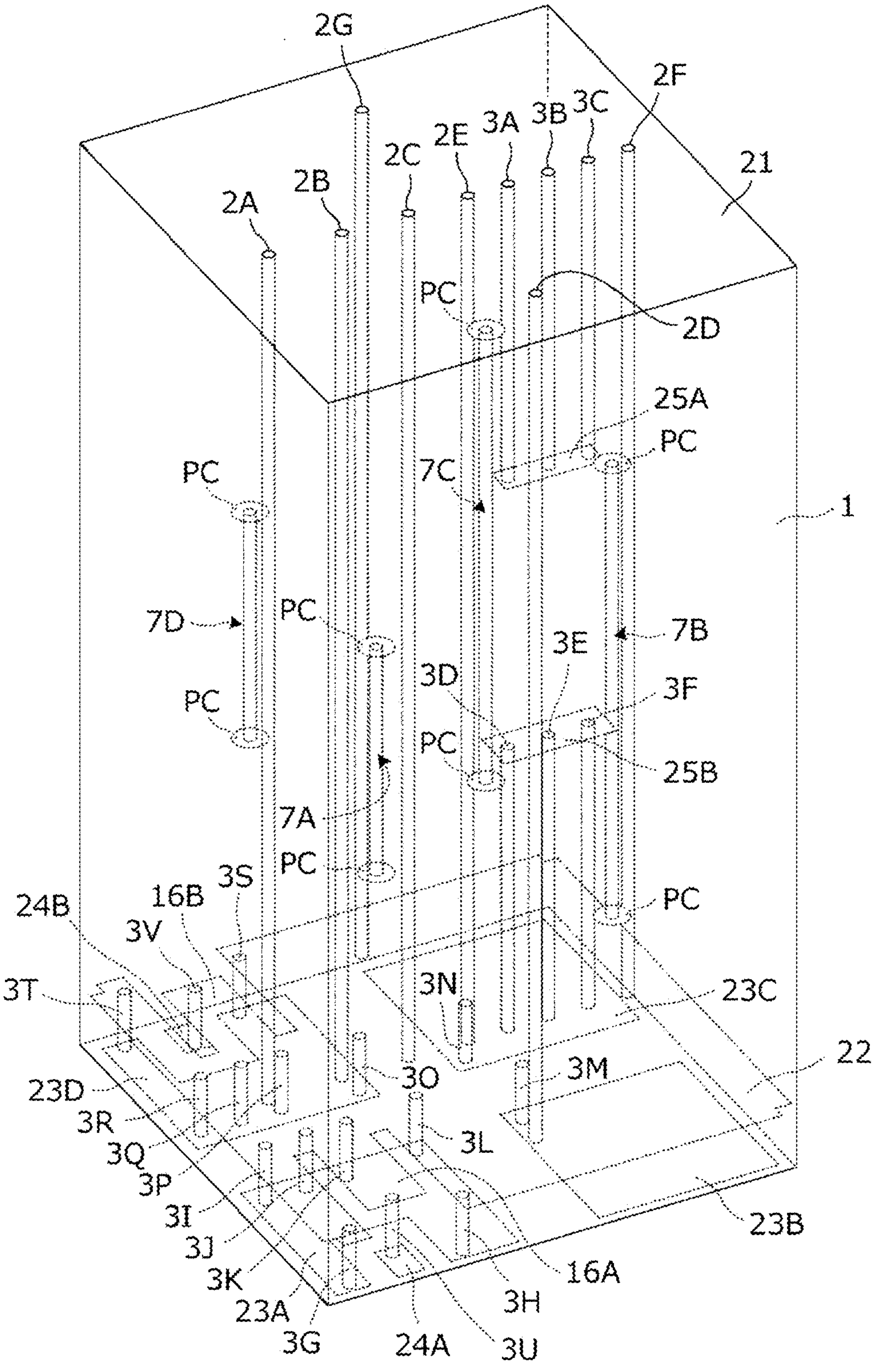
FIG. 2 is a perspective view of the dielectric waveguide filter expanded in a thickness direction.
Figure 3:
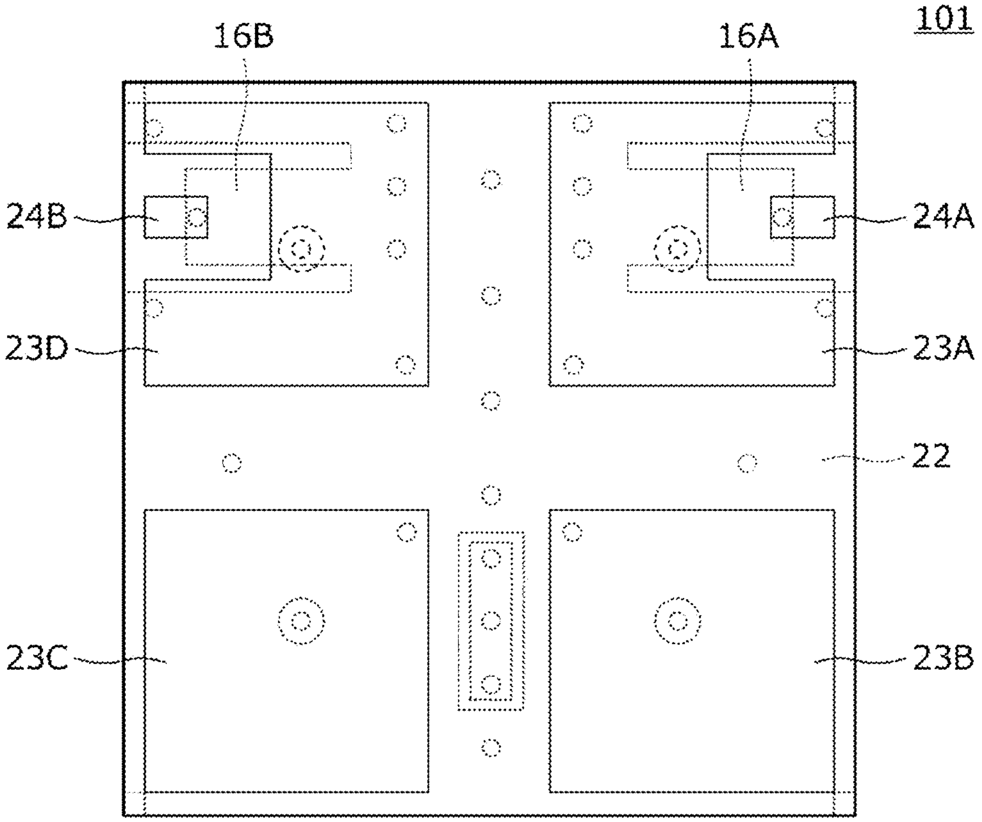
FIG. 3 is a bottom view of the dielectric waveguide filter.
Figure 4:
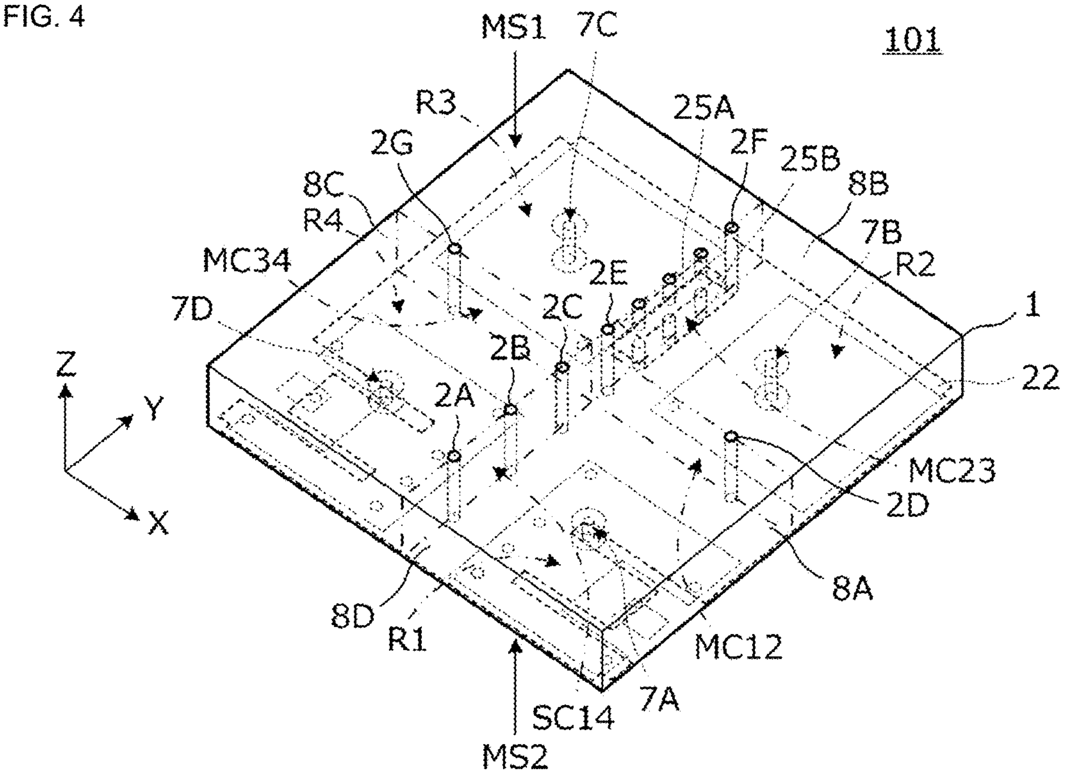
FIG. 4 is a perspective view showing four dielectric waveguide resonator portions and main coupling portions and a sub coupling portion between dielectric waveguide resonators which the dielectric waveguide filter includes.

FIG. 1A is an external perspective view of a dielectric waveguide filter 101 according to a first preferred embodiment, and FIG. 1B is a perspective view showing an internal structure of the dielectric waveguide filter 101. FIG. 2 is a perspective view of the dielectric waveguide filter 101 expanded in a thickness direction. FIG. 3 is a bottom view of the dielectric waveguide filter 101. FIG. 4 is a perspective view showing four dielectric waveguide resonator portions and main coupling portions and a sub coupling portion between dielectric waveguide resonators which the dielectric waveguide filter 101 includes.

The dielectric waveguide filter 101 includes a dielectric plate 1. The dielectric plate 1 is obtained by processing, for example, dielectric ceramic, crystal, or resin into the shape of a rectangular parallelepiped. The dielectric plate 1 has a first principal surface MS1 and a second principal surface MS2 which face each other, and four side surfaces SS (FIG. 1A) which connect an outer edge of the first principal surface MS1 and an outer edge of the second principal surface MS2. In this example, the dielectric waveguide filter 101 measures about 3.5 mm in an X direction, 3.5 mm in a Y direction, and about 0.6 mm in a Z direction, as shown in FIG. 1B.

A first surface conductor 21 is provided at the first principal surface MS1 of the dielectric plate 1, and a second surface conductor 22 is provided at the second principal surface MS2 of the dielectric plate 1. Side conductor films 8A to 8D (8A, 8B, 8C, 8D) are provided at the side surfaces SS of the dielectric plate 1. The first surface conductor 21, the second surface conductor 22, and the side conductor films 8A to 8D are, for example, copper films which are formed by sputtering.

Internal conductors 7A to 7D (7A, 7B, 7C, 7D) which extend in a perpendicular direction to the first principal surface MS1 and are electrically connected to neither the first surface conductor 21 nor the second surface conductor 22 are provided inside the dielectric plate 1. Structures and functions of the internal conductors 7A to 7D will be described in detail later.

As shown in, for example, FIGS. 1B and 2, I/O electrodes 24A and 24B and ground electrodes 23A, 23B, 23C, and 23D are provided at a bottom surface of the dielectric plate 1. Strip conductors 16A and 16B which are connected to the I/O electrodes 24A and 24B through via conductors 3U and 3V, as shown in FIG. 2, are provided inside the dielectric plate 1. Via conductors 3A to 3T (3A, 3B, 3C, 3D, 3E, 3F, 3G, 3H, 3I, 3J, 3K, 3L, 3M, 3N, 3O, 3P, 3Q, 3R, 3S, 3T), as shown in FIG. 2, which connect the ground electrodes 23A, 23B, 23C, and 23D to the second surface conductor 22 are close to the bottom surface of the dielectric plate 1.

As indicated in, for example, FIGS. 1B and 2, window conductors 25A and 25B define inner layers of the dielectric plate 1. Through via conductors 2A to 2G (2A, 2B, 2C, 2D, 2E, 2F, 2G) which extend from the first surface conductor 21 to the second surface conductor 22 are also provided in the dielectric plate 1. Additionally, via conductors 3A, 3B, and 3C which extend from the first surface conductor 21 to the window conductor 25A and via conductors 3D, 3E, and 3F which extend from the second surface conductor 22 to the window conductor 25B are provided in the dielectric plate 1.

The I/O electrodes 24A and 24B, the ground electrodes 23A to 23D, and the like are, for example, conductor patterns made of copper films. The through via conductors 2A to 2G and the via conductors 3A to 3V are, for example, conductors obtained by, for example, firing conductor paste.

As shown in FIG. 4, in the dielectric waveguide filter 101, four dielectric waveguide resonant spaces which are surrounded by the first surface conductor 21, the second surface conductor 22, the side conductor films 8A to 8D, and the through via conductors 2A to 2G are provided. In FIG. 4, chain double-dashed lines are imaginary lines showing divisions for dielectric waveguide resonators provided in the dielectric plate 1. As described above, the dielectric waveguide filter 101 includes four dielectric waveguide resonators R1, R2, R3, and R4.

Hereinafter, a “dielectric waveguide resonator” will also be simply referred to as a “resonator”. The resonators R1, R2, R3, and R4 are all resonators which have the TE101 mode as dominant modes. That is, the TE101 mode is a resonant mode with an electromagnetic field distribution, in which the Z direction shown in FIG. 4 is an electric field direction and a magnetic field rotates in a planar direction along an X-Y plane, and electric field strength reaches one peak in the X direction and one peak in the Y direction.

The internal conductors 7A to 7D shown in, for example, FIGS. 1B and 2 are arranged in middles of the dielectric waveguide resonant spaces in plan view (as viewed in the Z direction). For this reason, respective local capacitances are generated between the internal conductors 7A to 7D and the first surface conductor 21 and between the internal conductors 7A to 7D and the second surface conductor 22. With the above configuration, the internal conductors 7A to 7D partially narrow intervals in the dielectric waveguide resonant spaces in the electric field direction (Z direction).

With the local capacitances generated by the internal conductors 7A to 7D, resonant frequencies of the resonators R1, R2, R3, and R4 can be adjusted. Since capacitive components in the dielectric waveguide resonant spaces increase, a size of a dielectric waveguide resonator to achieve a predetermined resonant frequency can be reduced.

As shown in FIG. 4, a main coupling portion MC12 is provided between the resonators R1 and R2, a main coupling portion MC23 is provided between the resonators R2 and R3, and a main coupling portion MC34 is provided between the resonators R3 and R4. A sub coupling portion SC14 is provided between the resonators R1 and R4.

The main coupling portion MC12 shown in FIG. 4 includes the through via conductor 2D shown in FIG. 1B. That is, an opening in a horizontal direction is narrowed by the through via conductor 2D to provide a coupling window. The main coupling portion MC34 shown in FIG. 4 includes the through via conductor 2G shown in FIG. 1B. That is, an opening in the horizontal direction is narrowed by the through via conductor 2G to provide a coupling window.

The main coupling portion MC23 shown in FIG. 4 includes the through via conductors 2E and 2F, the via conductors 3A to 3F, and the window conductors 25A and 25B shown in FIG. 1B. The window conductors 25A and 25B are, for example, conductor patterns made of copper films.

The sub coupling portion SC14 shown in FIG. 4 includes the through via conductors 2A, 2B, and 2C shown in FIGS. 1B and 2. That is, an opening in the horizontal direction is narrowed by the through via conductors 2A, 2B, and 2C to provide a coupling window.

Since the main coupling portion MC12 acts as an inductive coupling window which limits widths (widths in the X direction) orthogonal to the electric field direction of the resonators R1 and R2 by the presence of the through via conductor 2D, the resonators R1 and R2 are inductively coupled together. Since the main coupling portion MC34 acts as an inductive coupling window which limits widths (widths in the X direction) orthogonal to the electric field direction of the resonators R3 and R4 by the presence of the through via conductor 2G, the resonators R3 and R4 are inductively coupled together. Since the sub coupling portion SC14 acts as an inductive coupling window which limits widths (widths in the Y direction) orthogonal to the electric field direction of the resonators R1 and R4 by the presence of the through via conductors 2A, 2B, and 2C, the resonators R1 and R4 are inductively coupled together. In contrast, since the main coupling portion MC23 acts as a capacitive coupling window which limits widths in the electric field direction (Z direction) of the resonators R2 and R3 by the presence of the via conductors 3A to 3F and the window conductors 25A and 25B, the resonators R2 and R3 are capacitively coupled together. Note that although the through via conductors 2E and 2F limit widths (widths in the Y direction) orthogonal to the electric field direction of the resonators R2 and R3, action limiting the widths in the electric field direction (Z direction) of the via conductors 3A to 3F and the window conductors 25A and 25B is strong in this example, and the resonators R2 and R3 are capacitively coupled together.

Figure 5:
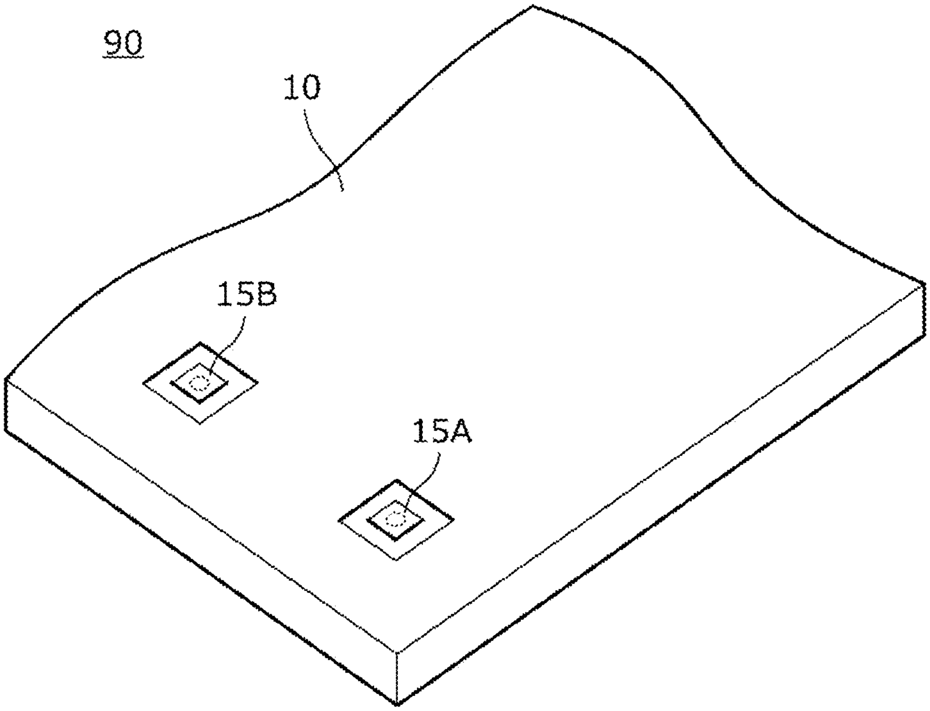
FIG. 5 is a partial perspective view of a circuit board on which the dielectric waveguide filter is to be mounted.

FIG. 5 is a partial perspective view of a circuit board 90 on which the dielectric waveguide filter 101 is to be mounted. A ground conductor 10 and I/O lands 15A and 15B are provided at the circuit board 90. In a state where the dielectric waveguide filter 101 is surface-mounted on the circuit board 90, the I/O electrodes 24A and 24B, as shown in FIG. 3, of the dielectric waveguide filter 101 are connected to the I/O lands 15A and 15B, and the ground electrodes 23A to 23D, as shown in FIG. 3, at a bottom surface of the dielectric waveguide filter 101 are connected to the ground conductor 10 of the circuit board 90.

Transmission lines, such as a strip line, a microstrip line, and a coplanar line, which connect with the I/O lands 15A and 15B are provided at the circuit board 90.

Signals in a TEM mode propagate to the strip conductors 16A and 16B inside the dielectric plate 1 shown in, for example, FIGS. 1B and 2, an electromagnetic field in the TEM mode and an electromagnetic field in the TE101 mode of the resonators R1 and R4 are coupled, and the signals are mode-converted.

Figure 6A:
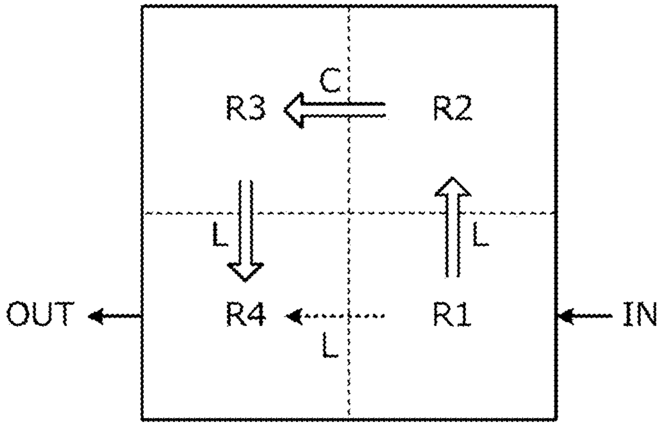
FIGS. 6A and 6B are charts showing a coupling structure for the four resonators of the dielectric waveguide filter.
Figure 6B:
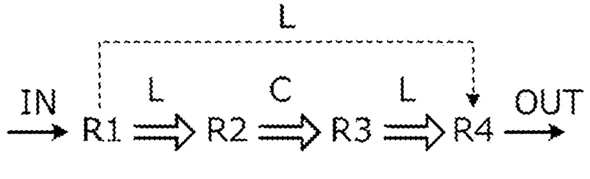

FIGS. 6A and 6B are charts showing a coupling structure for the four resonators of the dielectric waveguide filter 101 of the present preferred embodiment. In FIGS. 6A and 6B, the resonator R1 is a resonator at a first stage, the resonator R2 is a resonator at a second stage, the resonator R3 is a resonator at a third stage, the resonator R4 is a resonator at a fourth stage (last stage), and the resonators R1 to R4 are arranged between an input IN and an output OUT of the dielectric waveguide filter 101. A route indicated by a double line in FIGS. 6A and 6B is a main coupling portion, and a broken line is a sub coupling portion. In FIGS. 6A and 6B, "L" denotes inductive coupling, and "C" denotes capacitive coupling.

In the dielectric waveguide filter 101 of the present preferred embodiment, the resonators R1, R2, R3, and R4 and the main coupling portions MC12, MC23, and MC34, as shown in FIG. 4, are arranged along a main route for signal propagation, the main coupling portion MC12 is an inductive coupling portion, the main coupling portion MC23 is a capacitive coupling portion, and the main coupling portion MC34 is an inductive coupling portion. That is, the main coupling portions include the inductive coupling portions and the capacitive coupling portion, and the inductive coupling portions and the capacitive coupling portion are alternately and repeatedly arranged along the main route for signal propagation.

In the dielectric waveguide filter 101 of the present preferred embodiment, a main coupling portion between the resonator R1 that inputs and outputs signals from and to the outside and the resonator R2 that is coupled to the resonator R1 is an inductive coupling portion. Similarly, a main coupling portion between the resonator R4 that inputs and outputs signals from and to the outside and the resonator R3 that is coupled to the resonator R4 is an inductive coupling portion.

In the dielectric waveguide filter 101 of the present preferred embodiment, the resonator R1 and the resonator R4 are arranged along the sub coupling portion SC14 (FIG. 4) besides the main coupling portions MC12, MC23, and MC34. That is, the sub coupling portion SC14 is between the resonator R1 and the resonator R4. The sub coupling portion SC14 is an inductive coupling portion, and coupling in the sub coupling portion SC14 is weaker than coupling in the main coupling portions MC12, MC23, and MC34.

Figure 7:
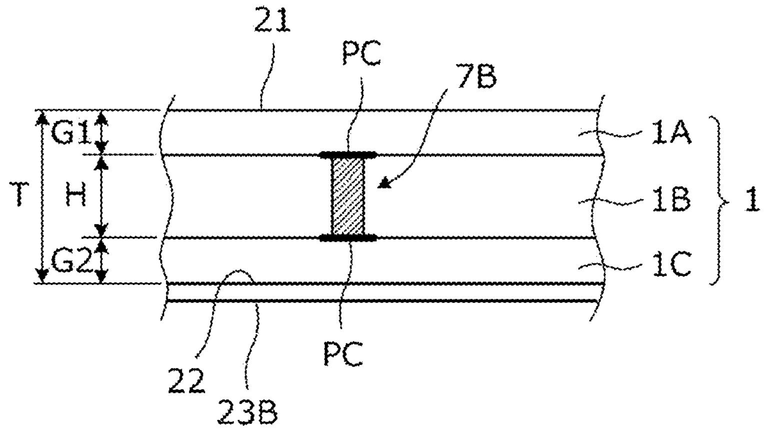
FIG. 7 is a partial sectional view of the dielectric waveguide filter taken at a position passing through an internal conductor.

FIG. 7 is a partial sectional view of the dielectric waveguide filter 101 taken at a position passing through an internal conductor 7B. The dielectric plate 1 is a multilayer body of dielectric layers 1A, 1B, and 1C. The internal conductor 7B is a solid cylindrical via conductor which is provided in the dielectric layer 1B, the dielectric layer 1A is present between the internal conductor 7B and the first surface conductor 21, and the dielectric layer 1C is present between the internal conductor 7B and the second surface conductor 22. That is, the internal conductor 7B is a conductor which is provided in the dielectric layer 1B as an inner layer of the plurality of dielectric layers 1A, 1B, and 1C. The construction of the dielectric plate 1 using a multilayer substrate in the above-described manner makes it easier to provide the internal conductor 7B in the dielectric plate 1.

The internal conductor 7B includes a planar conductor PC (FIGS. 2 and 7) which faces the first surface conductor 21 in parallel and a planar conductor PC which faces the second surface conductor 22 in parallel. The planar conductors PC are, for example, conductor patterns made of copper films. The provision of the planar conductors PC in the above-described manner makes it possible to easily increase local capacitances generated between the internal conductor 7B and the first surface conductor 21 and between the internal conductor 7B and the second surface conductor even if a diameter of the via conductor is small. Additionally, the capacitances can be easily set to predetermined values using areas of the planar conductors PC. Since the capacitances can also be determined by the areas of the planar conductors PC, the capacitances can be set to predetermined capacitances without being affected by a thickness dimension of the dielectric layer 1B.

A permittivity of the dielectric layer 1A between the first surface conductor 21 and the internal conductor 7B and a permittivity of the dielectric layer 1C between the second surface conductor 22 and the internal conductor 7B are higher than a permittivity of a dielectric (the dielectric layer 1B) in a different region.

In the dielectric waveguide resonant space, a parasitic resonant mode may appear in which an electric field faces in a direction along the first surface conductor 21 and the second surface conductor 22 (that is, a magnetic field rotates in a perpendicular direction (the Z direction shown in FIG. 4) to the first surface conductor 21 and the second surface conductor 22). Since a major portion of the electric field in the parasitic resonant mode passes through the dielectric layer 1B that is in a middle of an electric field distribution, even if the permittivities of the dielectric layers 1A and 1C are high, a resonant frequency in the parasitic resonant mode does not decrease much. In contrast, since an electric field in the TE101 mode faces in the perpendicular direction (the Z direction shown in FIG. 4) to the first surface conductor 21 and the second surface conductor 22, a resonant frequency decreases with increase in the permittivities of the dielectric layers 1A and 1C. In other words, by making the permittivities of the dielectric layers 1A and 1C higher than the permittivity of the dielectric layer 1B, the resonant frequency in the TE101 mode can be effectively pulled away from the resonant frequency in the parasitic resonant mode. This makes it possible to avoid being affected by parasitic resonance.

Although the internal conductor 7B is shown in FIG. 7, the same applies to the other internal conductors 7A, 7C, and 7D.

Figure 8A:
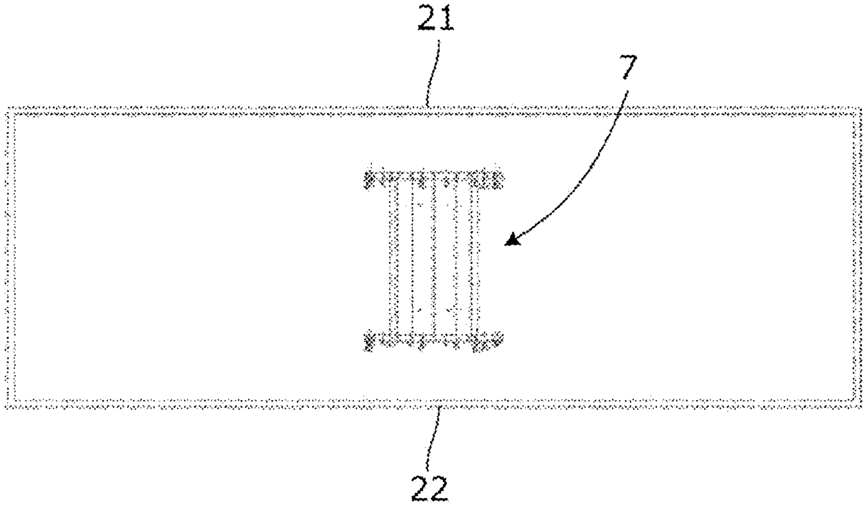
FIGS. 8A and 8B are charts showing action of an internal conductor according to the first preferred embodiment of the present invention.
Figure 8B:
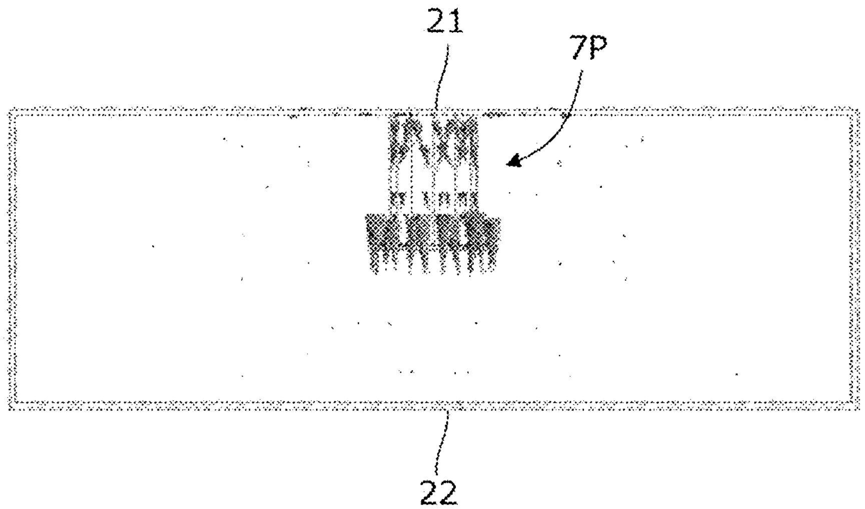

FIGS. 8A and 8B are charts showing functions of an internal conductor according to the present preferred embodiment. FIG. 8A is a chart showing a distribution of a current density of an internal conductor 7 for a simulation, and FIG. 8B is a chart showing a distribution of a current density of a conductor 7P for a simulation according to a comparative example. In a dielectric waveguide filter according to the comparative example, one end of the conductor 7P is made electrically continuous with the first surface conductor 21.

According to the present preferred embodiment, since the internal conductor 7 is isolated from the first surface conductor and the second surface conductor 22, that is, the internal conductor 7 is floating galvanically from potentials of the first surface conductor 21 and the second surface conductor 22, the degree of concentration of currents at the internal conductor 7 is low (current-concentrated portions are dispersed). For this reason, a dielectric waveguide resonator having a high Q factor is obtained.

Here, a non-limiting example of improvement in Q factor will be illustrated. A dielectric plate used in each simulation is made of low-temperature fired ceramics (LTCC) having a relative permittivity εr of 8.5, sizes of the first surface conductor 21 and the second surface conductor 22 are set to 1.6 mm×1.6 mm, and a distance between the first surface conductor 21 and the second surface conductor 22 is set to 0.55 mm. In this case, a resonant frequency in the TE101 mode is 45.4 GHz, and unloaded Q (hereinafter denoted as "Qo") is 350. If the conductor 7P of the comparative example shown in FIG. 8B is provided in this dielectric waveguide resonant space and the resonant frequency is set to 38.6 GHz, Qo is 320. On the other hand, if the internal conductor 7 of the present preferred embodiment shown in FIG. 8A is provided and the resonant frequency is set to 38.6 GHz, Qo is 349. That is, Qo is improved by about 8% compared with a dielectric waveguide resonator provided with the conductor 7P of the comparative example. Also, a reduction in Qo due to provision of the internal conductor 7 of the present preferred embodiment is as tiny as about 0.3%.

Figure 9:
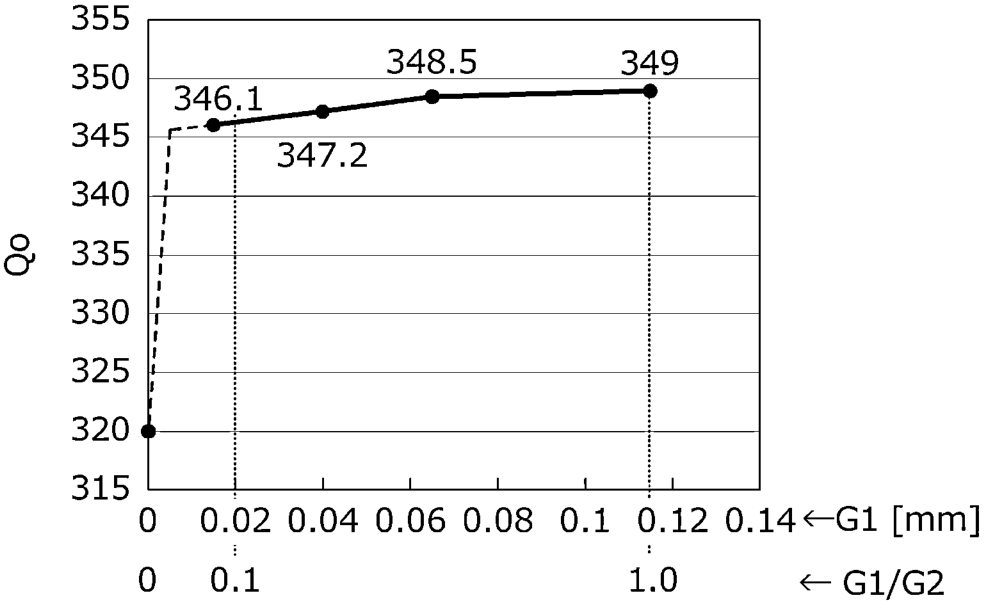
FIG. 9 is a graph showing a relationship between a position of an internal conductor in a dielectric plate and Qo.

A relationship between a position of an internal conductor in the dielectric plate 1 and a Q factor will next be illustrated. FIG. 9 is a graph showing the relationship between the position of the internal conductor in the dielectric plate 1 and Qo, including value points (346.1 347.2, 348.5) which correspond to values of simulated samples in accordance with the present invention. In this example, in FIG. 7, a distance T between the first surface conductor 21 and the second surface conductor 22 is 0.55 mm, and a height H of the internal conductor 7B is 0.32 mm. If a distance G1 between the internal conductor 7B and the first surface conductor 21 and a distance G2 between the internal conductor 7B and the second surface conductor 22 are changed, Qo of the resonator changes as indicated by FIG. 9.

In FIG. 9, the abscissa represents the distance G1 and a value of G1/G2, and the ordinate represents Qo of the resonator. If G1=1.15 mm, G2=1.15 mm holds and the internal conductor 7B is located at a middle position between the first surface conductor 21 and the second surface conductor 22. In this state, Qo reaches 349, which is a maximum value. If the distance G1 is reduced, Qo decreases gradually but a rate of the decrease is low. If the conductor 7P of the comparative example is provided, G1=0 holds and Qo decreases to up to 320.

As described above, in FIG. 8A, since the internal conductor 7 is electrically connected to neither the first surface conductor 21 nor the second surface conductor 22, that is, the internal conductor 7 is floating galvanically from the potentials of the first surface conductor and the second surface conductor, the degree of concentration of currents at the internal conductor 7 is low. For this reason, a dielectric waveguide resonator having a high Q factor is obtained. Also, a dielectric waveguide filter having a low insertion loss is obtained. Particularly, if the ratio G1/G2 (FIG. 7) of the distance G1 between the first surface conductor 21 and the internal conductor to the distance G2 between the internal conductor 7 and the second surface conductor 22 falls within a range from about 0.1 to about 1.0 inclusive, concentration of currents at an end portion of the internal conductor 7 is effectively mitigated, and a dielectric waveguide resonator having high Qo is obtained.

Figure 10:
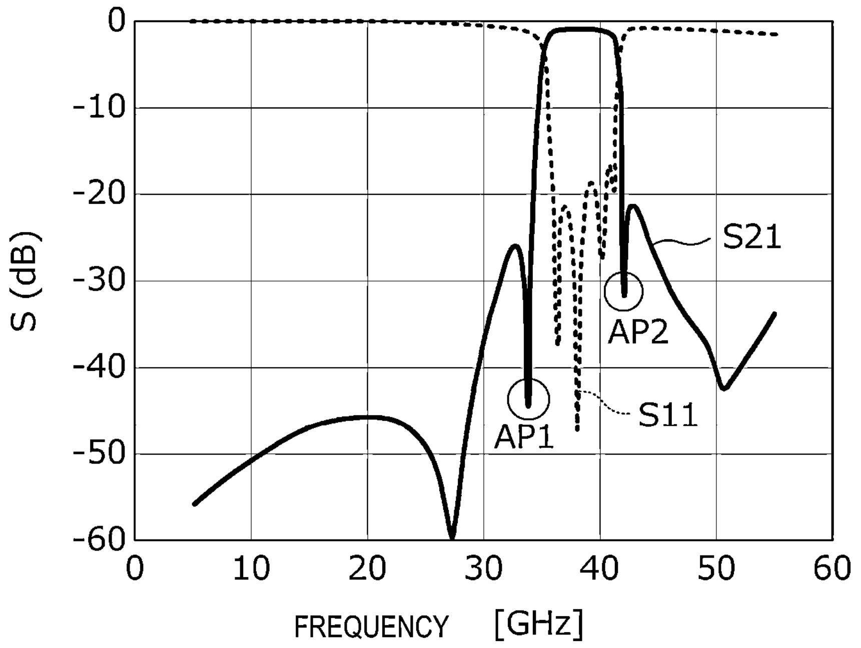
FIG. 10 is a graph showing frequency characteristics which are reflection characteristics and bandpass characteristics of the dielectric waveguide filter.

FIG. 10 is a graph showing frequency characteristics which are reflection characteristics (i.e., S in dB) and pass band characteristics (i.e., frequency in GHz) of the dielectric waveguide filter 101. In FIG. 10, S11 represents reflection characteristics, and S21 represents bandpass characteristics. As indicated by FIG. 10, the dielectric waveguide filter 101 of the present preferred embodiment exhibits band pass filter characteristics for the 38 GHz band centered at 38.6 GHz. An attenuation pole AP1 appears on a low-frequency side of a pass band, and an attenuation pole AP2 appears on a high-frequency side of the pass band.

The reason why polarized characteristics appear in the above-described manner is as follows.

First, a transmission phase of a resonator is 90° behind on a low-frequency side of a resonant frequency of the resonator and is 90° ahead on a high-frequency side of the resonant frequency. Since inductive coupling and capacitive coupling have a relationship in which phases thereof are reverse to each other, if inductive coupling and capacitive coupling are combined, there is a frequency at which a signal traveling through a main coupling portion and a signal traveling through a sub coupling portion have opposite phases and the same amplitude. An attenuation pole appears at the frequency. In the dielectric waveguide filter 101 of the present preferred embodiment, since the first resonator R1 and the second resonator R2 are inductively coupled, the second resonator R2 and the third resonator R3 are capacitively coupled, the third resonator R3 and the fourth resonator R4 are inductively coupled, and the first resonator R1 and the fourth resonator R4 are sub-coupled with the second resonator R2 and the third resonator R3 bypassed (cross-coupling with an even number of stages bypassed is performed), phases at the main coupling portions from the first resonator R1 to the fourth resonator R4 and a phase at the sub coupling portion from the first resonator R1 to the fourth resonator R4 are reverse to each other on the low-frequency side of the pass band and are also reverse to each other on the high-frequency side. That is, attenuation poles appear on both the low-frequency side and the high-frequency side of the pass band.

Note that although an internal conductor is preferably a solid cylindrical via conductor in the above-described example, an internal conductor may be a tubular via conductor in the shape of, for example, a hollow cylinder.

Second Preferred Embodiment

A second preferred embodiment will illustrate a dielectric waveguide filter different in, for example, the number of stages of resonators from that illustrated in the first preferred embodiment.

Figure 11:
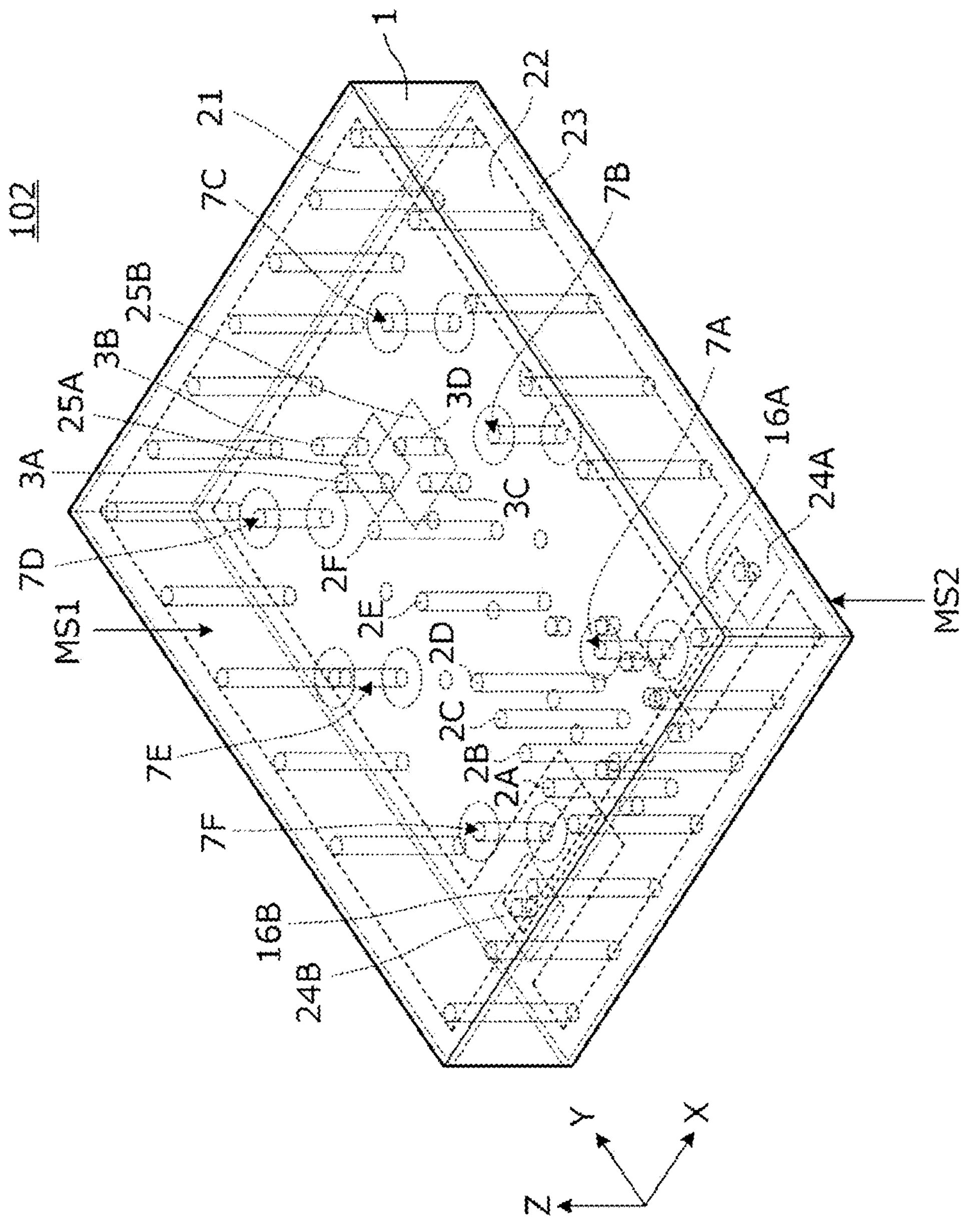
FIG. 11 is an external perspective view of a dielectric waveguide filter according to a second preferred embodiment of the present invention.
Figure 12:
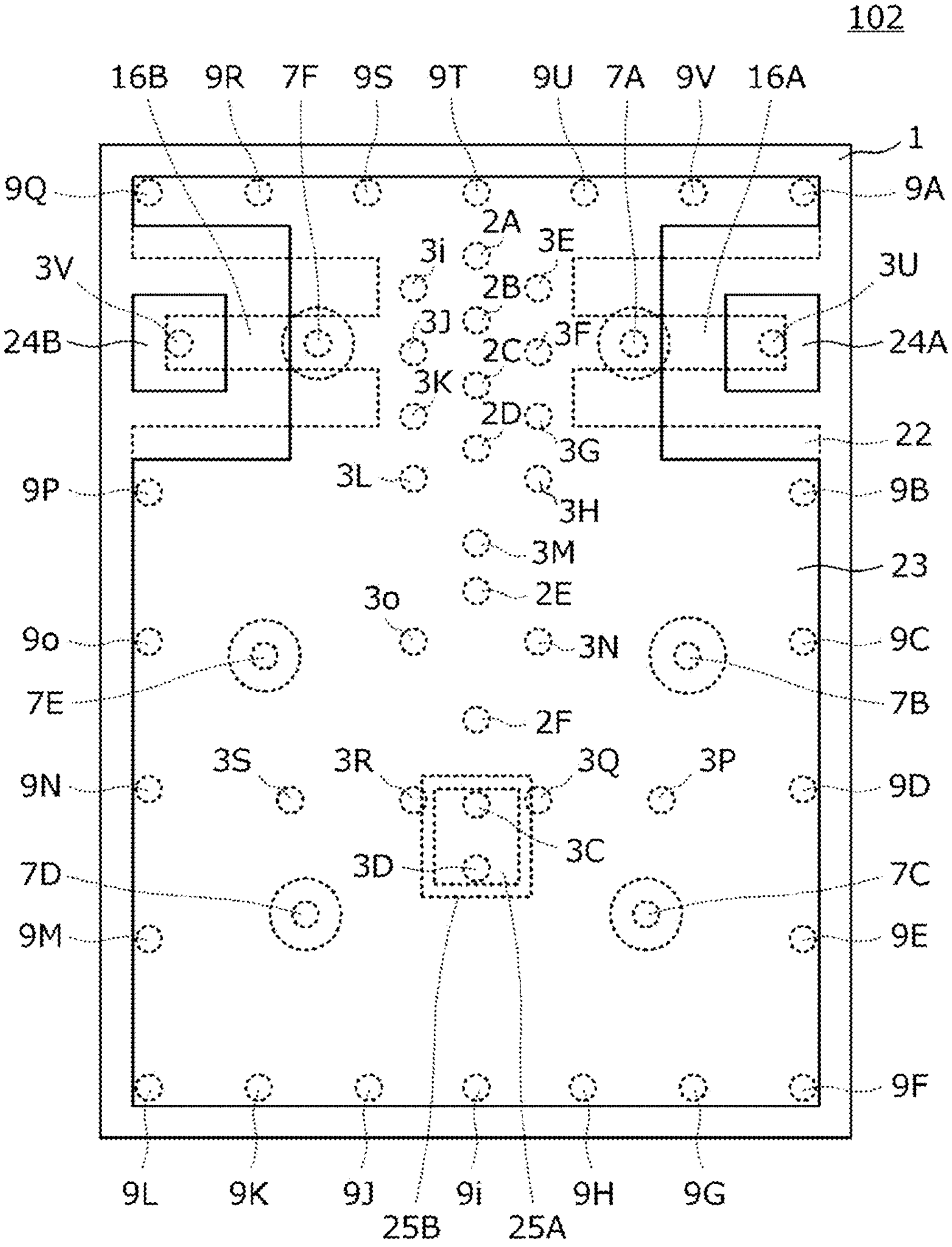
FIG. 12 is a bottom view of the dielectric waveguide filter.
Figure 13:
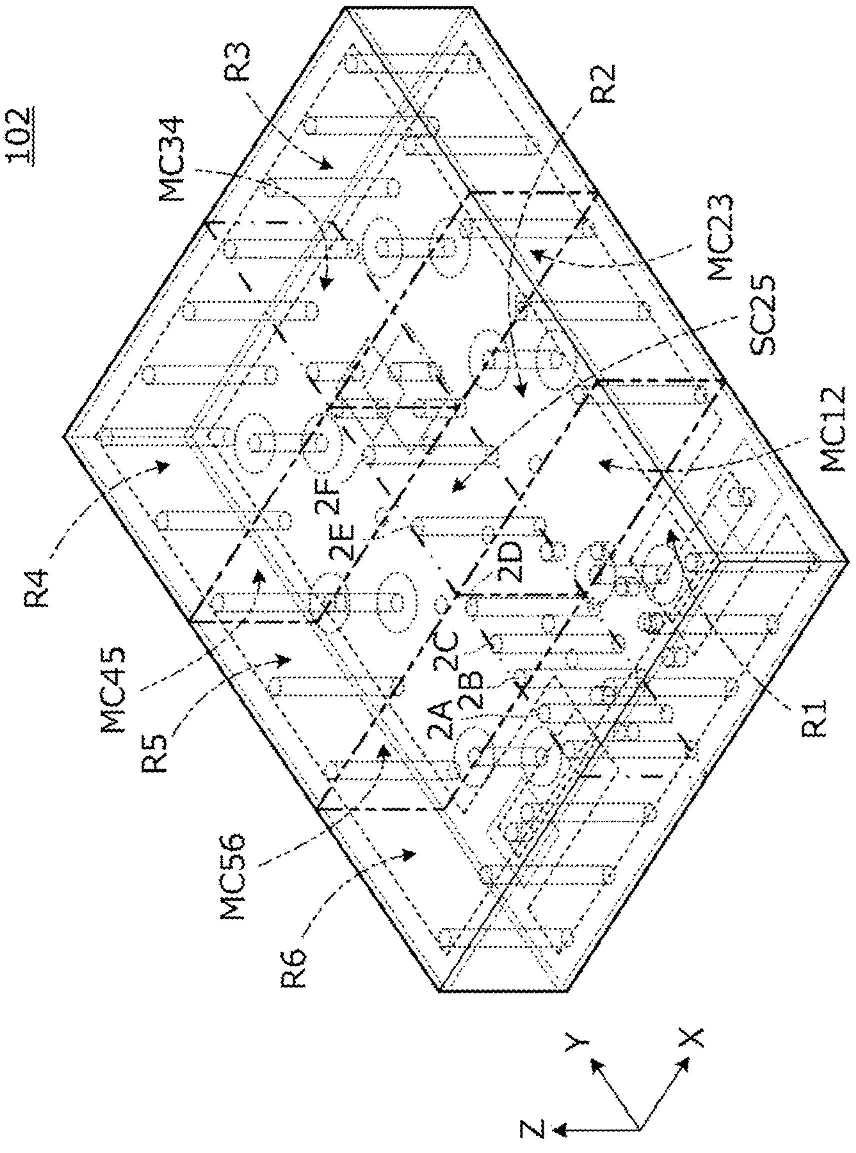
FIG. 13 is a perspective view showing six dielectric waveguide resonator portions and main coupling portions and a sub coupling portion between dielectric waveguide resonators which the dielectric waveguide filter includes.

FIG. 11 is an external perspective view of a dielectric waveguide filter 102 according to the second preferred embodiment. FIG. 12 is a bottom view of the dielectric waveguide filter 102. FIG. 13 is a perspective view showing six dielectric waveguide resonator portions and main coupling portions and a sub coupling portion between dielectric waveguide resonators which the dielectric waveguide filter 102 includes.

The dielectric waveguide filter 102 includes a dielectric plate 1. The dielectric plate 1 is obtained by processing, for example, dielectric ceramic, crystal, or resin into the shape of a rectangular parallelepiped. The dielectric plate 1 includes a first principal surface MS1 and a second principal surface MS2 which face each other, as shown in FIG. 11. A first surface conductor 21 is provided at a layer closer to the first principal surface MS1 of the dielectric plate 1, and a second surface conductor 22 and a ground electrode 23 are provided at layers closer to the second principal surface MS2 of the dielectric plate 1. In this example, the dielectric waveguide filter 102 measures about 2.5 mm in an X direction, about 3.2 mm in a Y direction, and about 0.7 mm in a Z direction.

Internal conductors 7A to 7F which extend in a perpendicular direction to the first principal surface MS1 and are electrically connected to neither the first surface conductor 21 nor the second surface conductor 22 are provided inside the dielectric plate 1.

I/O electrodes 24A and 24B and the ground electrode 23 are provided at a bottom surface of the dielectric plate 1. Strip conductors 16A and 16B which are connected to the I/O electrodes 24A and 24B through via conductors 3U and 3V are provided inside the dielectric plate 1. Via conductors 3A to 3S which connect the ground electrode 23 to the second surface conductor 22 are close to the bottom surface of the dielectric plate 1.

Window conductors 25A and 25B are inner layers of the dielectric plate 1. Through via conductors 2A to 2F which extend from the first surface conductor 21 to the second surface conductor 22 are also provided in the dielectric plate 1. Additionally, via conductors 3A and 3B, as shown in FIG. 11, which extend from the first surface conductor 21 to the window conductor 25A and via conductors 3C and 3D which extend from the second surface conductor 22 to the window conductor 25B are provided in the dielectric plate 1.

Through via conductors 9A to 9V which connect the first surface conductor 21 and the second surface conductor 22 are also formed along side surfaces of the dielectric plate 1 inside the dielectric plate 1.

As shown in FIG. 13, in the dielectric waveguide filter 102, six dielectric waveguide resonant spaces which are surrounded by the first surface conductor 21, the second surface conductor 22, as shown in FIG. 11, and the through via conductors 9A to 9V are provided, as shown in FIG. 12. In FIG. 13, chain double-dashed lines are imaginary lines showing divisions for dielectric waveguide resonators provided in the dielectric plate 1. As described above, the dielectric waveguide filter 102 includes six dielectric waveguide resonators R1, R2, R3, R4, R5, and R6. The resonators R1, R2, R3, R4, R5, and R6 are all resonators which have the TE101 mode as dominant modes.

The internal conductors 7A to 7F shown in, for example, FIGS. 11 and 12 are arranged in the dielectric waveguide resonant spaces in plan view (as viewed in the Z direction).

A main coupling portion MC12 is provided between the resonators R1 and R2, a main coupling portion MC23 is provided between the resonators R2 and R3, a main coupling portion MC34 is provided between the resonators R3 and R4, a main coupling portion MC45 is provided between the resonators R4 and R5, and a main coupling portion MC56 is provided between the resonators R5 and R6. A sub coupling portion SC25 is provided between the resonators R2 and R5.

As for any of the main coupling portions MC12, MC23, MC45, and MC56, there is no through via that an opening in a horizontal direction narrows. The respective dielectric waveguide resonant spaces of the resonators R1 to R6 are determined by the size of a resonant space demarcated by the first surface conductor 21, the second surface conductor 22, as shown in FIG. 11, and the through via conductors 9A to 9V, as shown in FIG. 12, and resonant frequencies to be used.

None of the main coupling portions MC12, MC23, MC45, and MC56 has a window which limits a width in an electric field direction (the Z direction) of the resonator, and the main coupling portions MC12, MC23, MC45, and MC56 perform inductive coupling.

The main coupling portion MC34 includes the via conductors 3A, 3B, 3C, and 3D and the window conductors 25A and 25B shown in FIG. 11. Since the main coupling portion MC34 acts as a capacitive coupling window that limits the width of the resonators R3 and R4 in the electric field direction (Z direction), the resonators R3 and R4 are capacitively coupled together.

Since the sub coupling portion SC25 acts as an inductive coupling window which limits the width of the resonators R2 and R5 (width in the Y direction) perpendicular to the electric field direction by the presence of the through via conductors 2E and 2F, the resonators R2 and R5 are inductively coupled together.

Figure 14A:
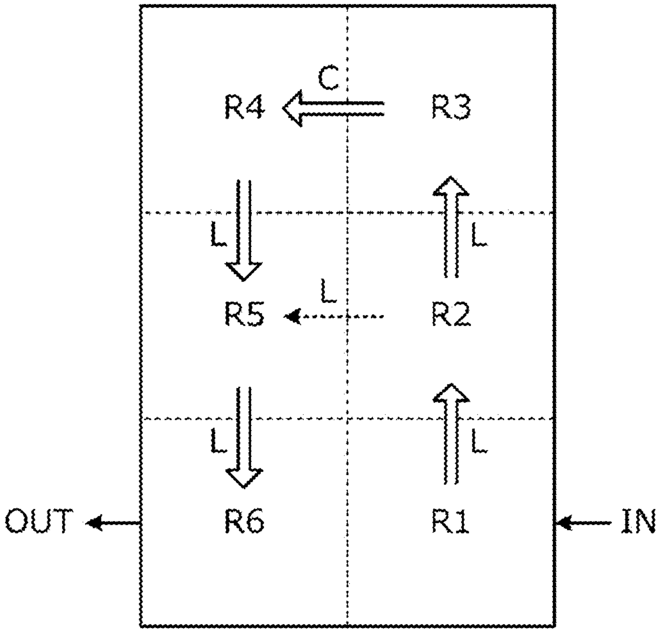
FIGS. 14A and 14B are charts showing a coupling structure for the six resonators of the dielectric waveguide filter of the second preferred embodiment of the present invention.
Figure 14B:
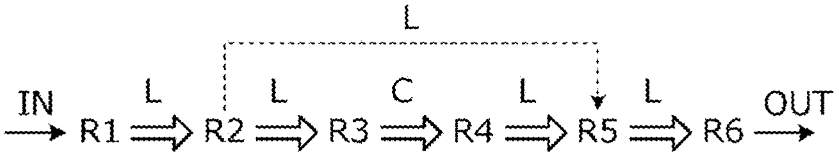

FIGS. 14A and 14B are charts showing a coupling structure for the six resonators of the dielectric waveguide filter 102 of the present preferred embodiment. In FIGS. 14A and 14B, the resonator R1 is a resonator at a first stage, the resonator R2 is a resonator at a second stage, the resonator R3 is a resonator at a third stage, the resonator R4 is a resonator at a fourth stage, the resonator R5 is a resonator at a fifth stage, the resonator R6 is a resonator at a sixth stage (last stage), and the resonators R1 to R6 are arranged between an input IN and an output OUT of the dielectric waveguide filter 102. A route indicated by a double line in FIGS. 14A and 14B is a main coupling portion, and a broken line is a sub coupling portion. In FIGS. 14A and 14B, "L" denotes inductive coupling, and "C" denotes capacitive coupling.

In the dielectric waveguide filter 102 of the present preferred embodiment, as shown in FIG. 13, the resonators R1, R2, R3, R4, R5, and R6 and the main coupling portions MC12, MC23, MC34, MC45, and MC56 are arranged along a main route for signal propagation. The main coupling portion MC12 is an inductive coupling portion, the main coupling portion MC23 is an inductive coupling portion, the main coupling portion MC34 is a capacitive coupling portion, the main coupling portion MC45 is an inductive coupling portion, and the main coupling portion MC56 is an inductive coupling portion. That is, the main coupling portions include the inductive coupling portions and the capacitive coupling portion, and the inductive coupling portions and the capacitive coupling portion are alternately and repeatedly arranged along the main coupling portions.

In the dielectric waveguide filter 102 of the present preferred embodiment, a main coupling portion between the resonator R1 that inputs and outputs signals from and to the outside and the resonator R2 that is coupled to the resonator R1 is an inductive coupling portion. Similarly, a main coupling portion between the resonator R6 that inputs and outputs signals from and to the outside and the resonator R5 that is coupled to the resonator R6 is an inductive coupling portion.

In the dielectric waveguide filter 102 of the present preferred embodiment, the resonator R2 and the resonator R5 are also arranged along the sub coupling portion SC25. That is, the sub coupling portion SC25 is provided between the resonator R2 and the resonator R5. The sub coupling portion SC25 is an inductive coupling portion, and coupling in the sub coupling portion SC25 is weaker than coupling in the main coupling portions MC12, MC23, MC34, MC45, and MC56.

Figure 15:
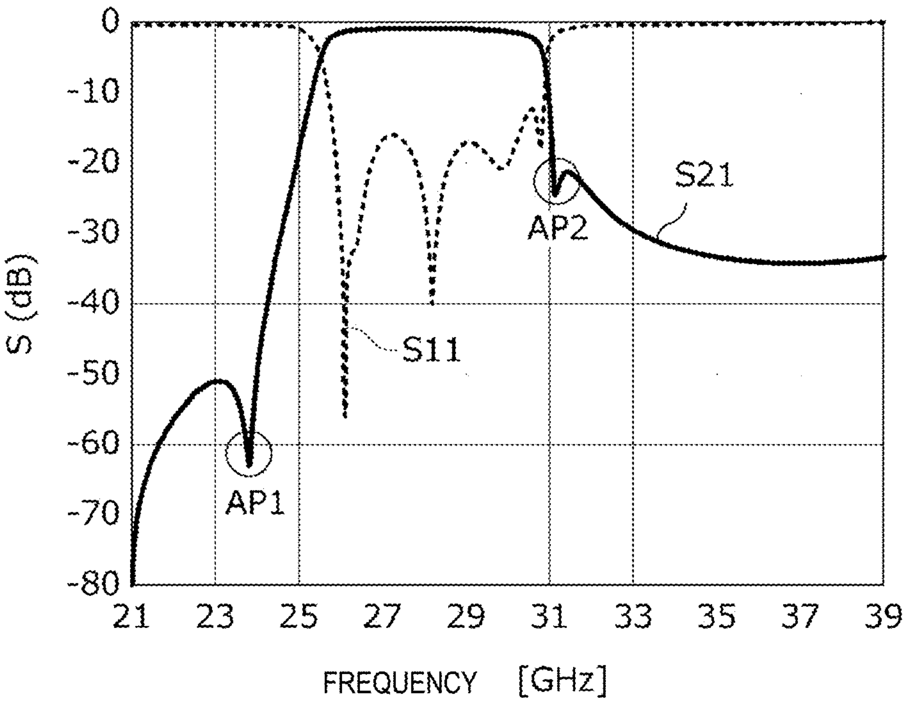
FIG. 15 is a graph showing frequency characteristics which are reflection characteristics and bandpass characteristics of the dielectric waveguide filter.

FIG. 15 is a graph showing frequency characteristics which are reflection characteristics (i.e., S in dB) and pass band characteristics (i.e., frequency in GHz) of the dielectric waveguide filter 102. In FIG. 15, S11 represents reflection characteristics, and S21 represents pass band characteristics. As indicated by FIG. 15, the dielectric waveguide filter 102 of the present preferred embodiment exhibits band pass filter characteristics for the 28 GHz band centered at 28 GHz. An attenuation pole AP1 appears on a low-frequency side of a pass band, and an attenuation pole AP2 appears on a high-frequency side of the pass band. In the above-described manner, polarized characteristics appear as in the dielectric waveguide filter 101 illustrated in the first preferred embodiment.

Third Preferred Embodiment

A third preferred embodiment will illustrate a dielectric waveguide filter including eight stages of dielectric waveguide resonators and one dielectric waveguide resonator for a trap resonator.

Figure 16:
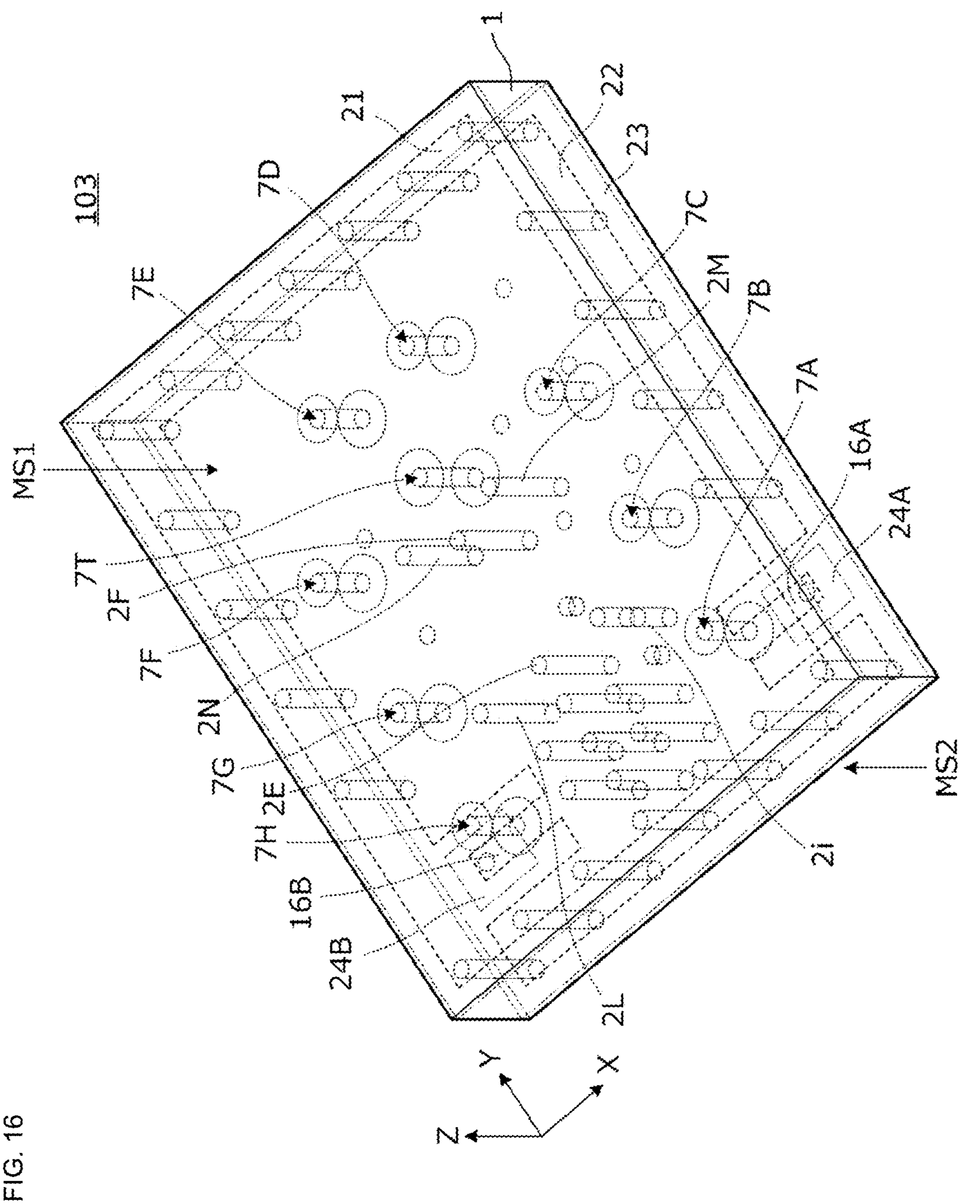
FIG. 16 is an external perspective view of a dielectric waveguide filter according to a third preferred embodiment of the present invention.
Figure 17:
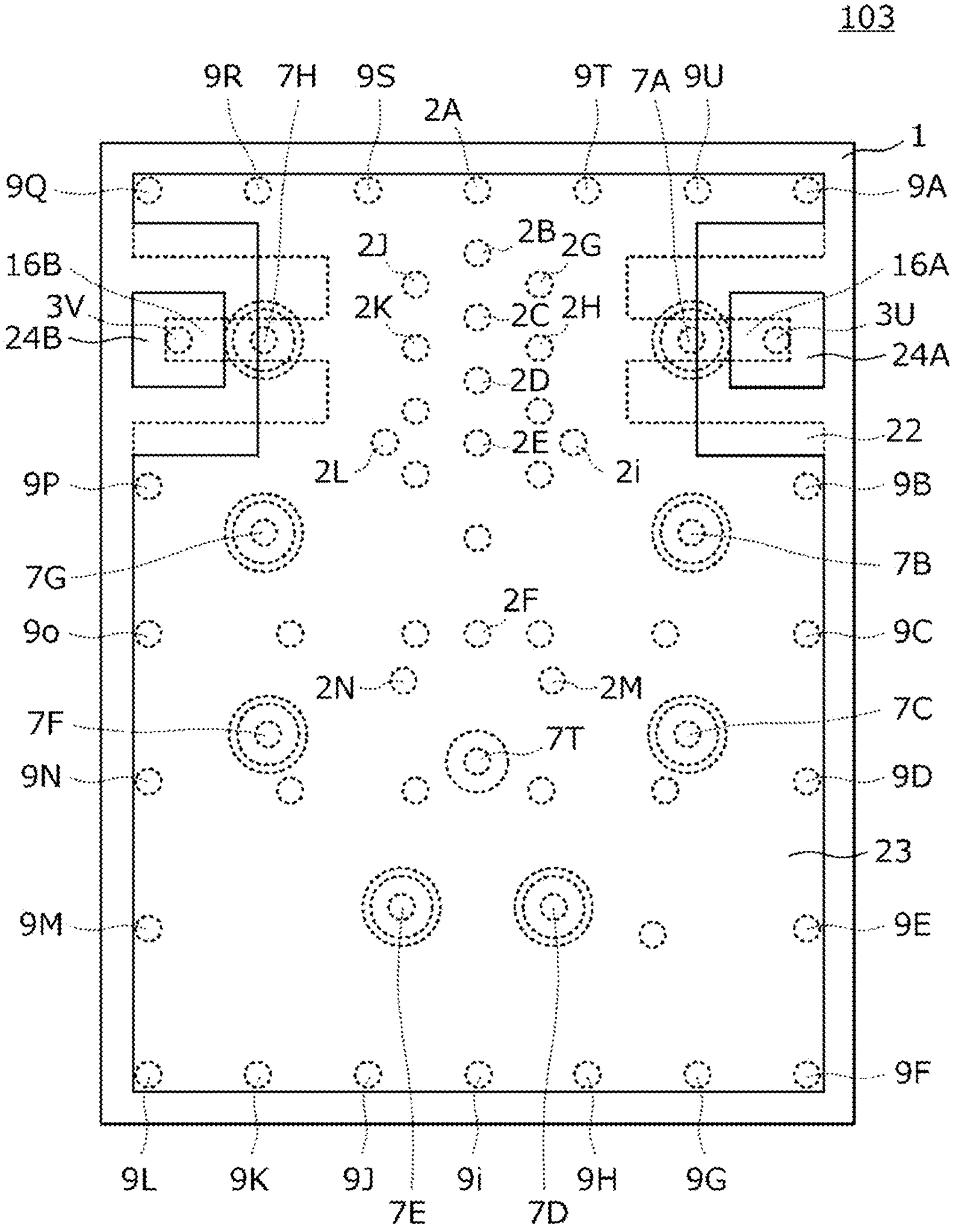
FIG. 17 is a bottom view of the dielectric waveguide filter.
Figure 18:
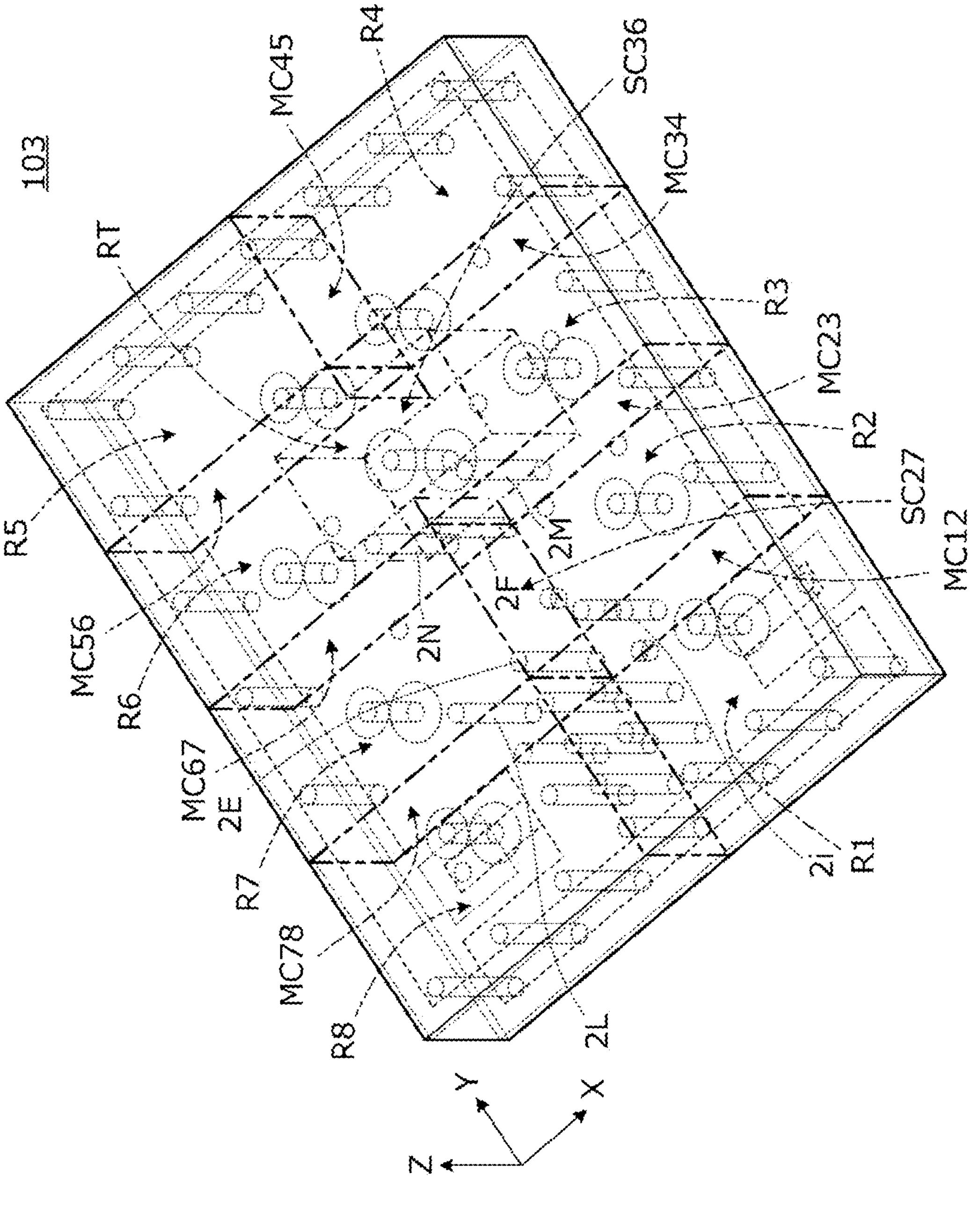
FIG. 18 is a perspective view showing a plurality of dielectric waveguide resonator portions and main coupling portions and sub coupling portions between dielectric waveguide resonators which the dielectric waveguide filter includes.

FIG. 16 is an external perspective view of a dielectric waveguide filter 103 according to the third preferred embodiment. FIG. 17 is a bottom view of the dielectric waveguide filter 103. FIG. 18 is a perspective view showing a plurality of dielectric waveguide resonator portions and main coupling portions and sub coupling portions between dielectric waveguide resonators which the dielectric waveguide filter 103 includes.

The dielectric waveguide filter 103 includes a dielectric plate 1. The dielectric plate 1 is obtained by processing, for example, dielectric ceramic, crystal, or resin into the shape of a rectangular parallelepiped, as shown in FIGS. 16 and 17. The dielectric plate 1 includes a first principal surface MS1 and a second principal surface MS2 which face each other, as shown in FIG. 16. A first surface conductor 21 is provided at a layer closer to the first principal surface MS1 of the dielectric plate 1, and a second surface conductor 22 and a ground electrode 23 are formed at layers closer to the second principal surface MS2 of the dielectric plate 1, as shown in FIG. 16. In this example, the dielectric waveguide filter 103 measures about 2.5 mm in an X direction, about 3.2 mm in a Y direction, and about 0.7 mm in a Z direction, as shown in FIG. 16.

I/O electrodes 24A and 24B and the ground electrode 23 are provided at a bottom surface of the dielectric plate 1. Strip conductors 16A and 16B which are connected to the I/O electrodes 24A and 24B through via conductors 3U and 3V are provided inside the dielectric plate 1. A plurality of via conductors which connect the ground electrode 23 to the second surface conductor 22 are formed close to the bottom surface of the dielectric plate 1.

Through via conductors 2A to 2N which extend from the first surface conductor 21 to the second surface conductor 22 are provided in the dielectric plate 1.

Through via conductors 9A to 9U which connect the first surface conductor 21 and the second surface conductor 22 are also provided along side surfaces of the dielectric plate 1 inside the dielectric plate 1.

As shown in, for example, FIGS. 17 and 18, in the dielectric waveguide filter 103, eight dielectric waveguide resonant spaces which are surrounded by the first surface conductor 21, the second surface conductor 22, and the through via conductors 9A to 9U are provided. One dielectric waveguide resonant space for a trap resonator is also provided. In FIG. 18, chain double-dashed lines are imaginary lines showing divisions for dielectric waveguide resonators provided in the dielectric plate 1. As described above, the dielectric waveguide filter 103 includes eight dielectric waveguide resonators R1, R2, R3, R4, R5, R6, R7, and R8 and a dielectric waveguide resonator RT for a trap resonator. The resonators R1, R2, R3, R4, R5, R6, R7, R8, and RT are all resonators which have the TE101 mode as dominant modes.

Internal conductors 7A to 7H and 7T shown in, for example, FIGS. 16 and 17 are arranged in the dielectric waveguide resonant spaces in plan view (as viewed in the Z direction).

Of the above-described resonators R1 to R8, the four resonators R1 to R4 are a first group of resonators, and the four resonators R5 to R8 are a second group of resonators. A main coupling portion MC45 is provided between the resonator R4 at a last stage in the first group and the resonator R5 at a first stage in the second group. The resonator R1 at a first stage of the first group and the resonator R8 at a last stage of the second group are resonators as I/O portions.

A main coupling portion MC12 is provided between the resonators R1 and R2, a main coupling portion MC23 is provided between the resonators R2 and R3, and a main coupling portion MC34 is provided between the resonators R3 and R4. That is, as for the first group of resonators, the four resonators R1 to R4 are series-connected via the main coupling portions. The main coupling portion MC45 is provided between the resonators R4 and R5. A main coupling portion MC56 is provided between the resonators R5 and R6, a main coupling portion MC67 is provided between the resonators R6 and R7, and a main coupling portion MC78 is provided between the resonators R7 and R8. That is, as for the second group of resonators, the four resonators R5 to R8 are series-connected via the main coupling portions. Additionally, a sub coupling portion SC27 is provided between the resonators R2 and R7, and a sub coupling portion SC36 is provided between the resonators R3 and R6.

The through via conductor 2*i* shown in FIG. 17 narrows an opening in a horizontal direction of the main coupling portion MC12 to inductively couple the resonator R1 and the resonator R2. Similarly, the through via conductor 2L narrows an opening in the horizontal direction of the main coupling portion MC78 to inductively couple the resonator R7 and the resonator R8. Further, the through via conductor 2M narrows an opening in the horizontal direction of the main coupling portion MC23 to inductively couple the resonator R2 and the resonator R3. Similarly, the through via conductor 2N narrows an opening in the horizontal direction of the main coupling portion MC67 to inductively couple the resonator R6 and the resonator R7. The through via conductors 2E and 2F narrow an opening in the horizontal direction of the sub coupling portion SC27 to inductively couple the resonator R2 and the resonator R7. The internal conductor 7T narrows an opening in a longitudinal direction of the sub coupling portion SC36 to capacitively couple the resonator R3 and the resonator R6.

As for the main coupling portions MC34, MC45, and MC56, there is no through via that an opening in the horizontal direction narrows. Inductive coupling is performed at each of the portions because of the size of a resonant space demarcated by the first surface conductor 21, the second surface conductor 22, and the through via conductors 9A to 9U and resonant frequencies to be used.

A space where the internal conductor 7T is provided defines and functions as one trap resonator RT. The trap resonator RT is provided between the resonator R3 that is one stage ahead of the resonator R4 at the last stage of the first group and the resonator R6 that is one stage behind the resonator R5 at the first stage of the second group.

The trap resonator RT is provided at a position surrounded by the internal conductor 7D of the resonator R4 at the last stage of the first group, the internal conductor 7E of the resonator R5 at the first stage of the second group, the internal conductor 7C of the resonator R3 one stage ahead of the resonator R4 at the last stage of the first group, and the internal conductor 7F of the resonator R6 one stage behind the resonator R5 at the first stage of the second group.

A distance between the internal conductor 7D of the resonator R4 at the last stage of the first group and the internal conductor 7E of the resonator R5 at the first stage of the second group is narrower than a distance between the internal conductor 7C of the resonator R3 one stage ahead of the resonator R4 at the last stage of the first group and the internal conductor 7F of the resonator R6 one stage behind the resonator R5 at the first stage of the second group. With this configuration, regions, which are high in electric field strength, of the resonators R4, R5, and RT are close to each other, and the trap resonator RT is coupled to the resonators R4 and R5. From this, it can also be said that the trap resonator RT is a resonator branched from the resonators R4 and R5.

In the present preferred embodiment, a distance between the internal conductor 7D of the resonator R4 at the last stage of the first group and the internal conductor 7T for the trap resonator is equal to a distance between the internal conductor 7E of the resonator R5 at the first stage of the second group and the internal conductor 7T for the trap resonator. For this reason, strength of coupling of the resonator R4 to the trap resonator RT and strength of coupling of the resonator R5 to the trap resonator RT are equal.

Note that since the internal conductors 7C and 7T are away from each other and the internal conductors 7F and 7T are away from each other, that is, regions, which are high in electric field strength, of the resonators R3 and R6 and the trap resonator RT are relatively away from each other, the resonators R3 and R6 are not particularly coupled to the trap resonator RT.

Figure 19A:
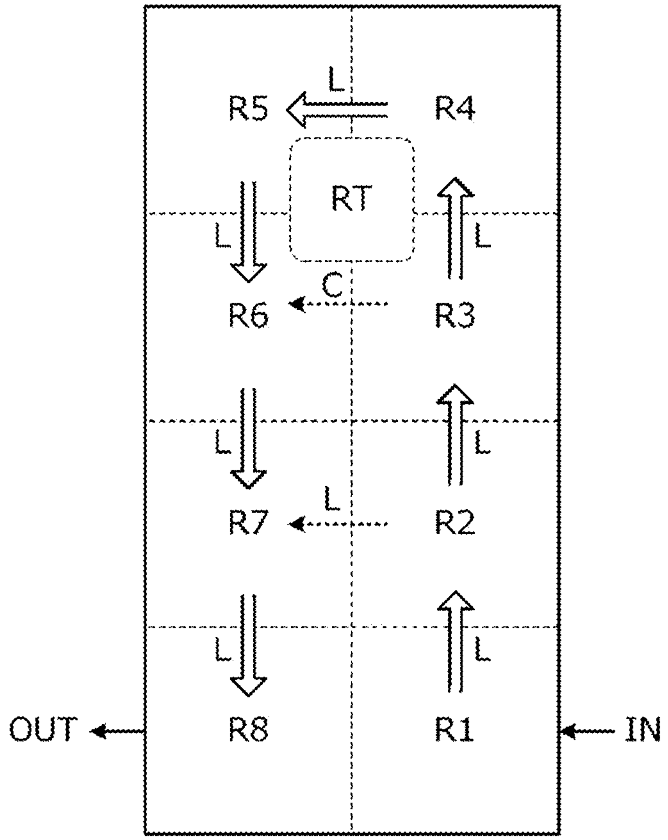
FIGS. 19A and 19B are charts showing a coupling structure for the plurality of resonators of the dielectric waveguide filter of the third preferred embodiment of the present invention.
Figure 19B:
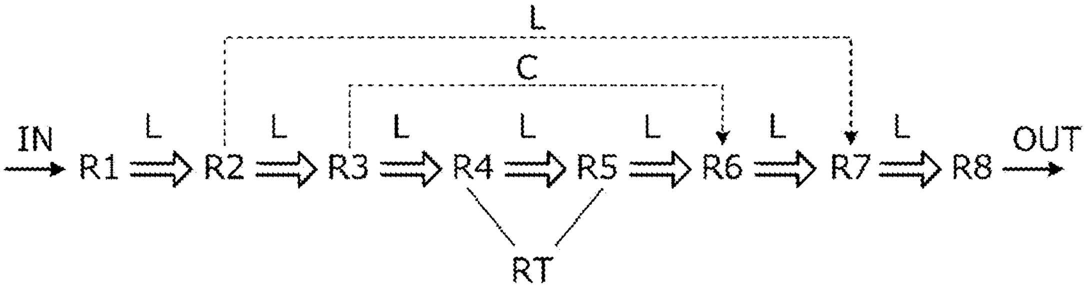

FIGS. 19A and 19B are charts showing a coupling structure for the plurality of resonators of the dielectric waveguide filter 103 of the present preferred embodiment. In FIGS. 19A and 19B, the resonator R1 is a resonator at a first stage, the resonator R2 is a resonator at a second stage, the resonator R3 is a resonator at a third stage, the resonator R4 is a resonator at a fourth stage, the resonator R5 is a resonator at a fifth stage, the resonator R6 is a resonator at a sixth stage, the resonator R7 is a resonator at a seventh stage, the resonator R8 is a resonator at an eighth stage (last stage), and the resonators R1 to R8 are arranged between an input IN and an output OUT of the dielectric waveguide filter 103. A route indicated by a double line in FIGS. 19A and 19B is a main coupling portion, and a broken line is a sub coupling portion. In FIGS. 19A and 19B, "L" denotes inductive coupling, and "C" denotes capacitive coupling.

As already described, in the dielectric waveguide filter 103 of the present preferred embodiment, the resonators R1, R2, R3, R4, R5, R6, R7, and R8 and the main coupling portions MC12, MC23, MC34, MC45, MC56, MC67, and MC78 are arranged along a main route for signal propagation. The main coupling portions MC12, MC23, MC34, MC45, MC56, MC67, and MC78 are all inductive coupling portions. The sub coupling portion SC27 is an inductive coupling portion, and the sub coupling portion SC36 is a capacitive coupling portion. Coupling in the sub coupling portion SC27 is weaker than coupling in the main coupling portions MC12, MC23, MC34, MC45, MC56, MC67, and MC78. Coupling in the sub coupling portion SC36 is weaker than coupling in the main coupling portions MC12, MC23, MC34, MC45, MC56, MC67, and MC78.

Figure 20:
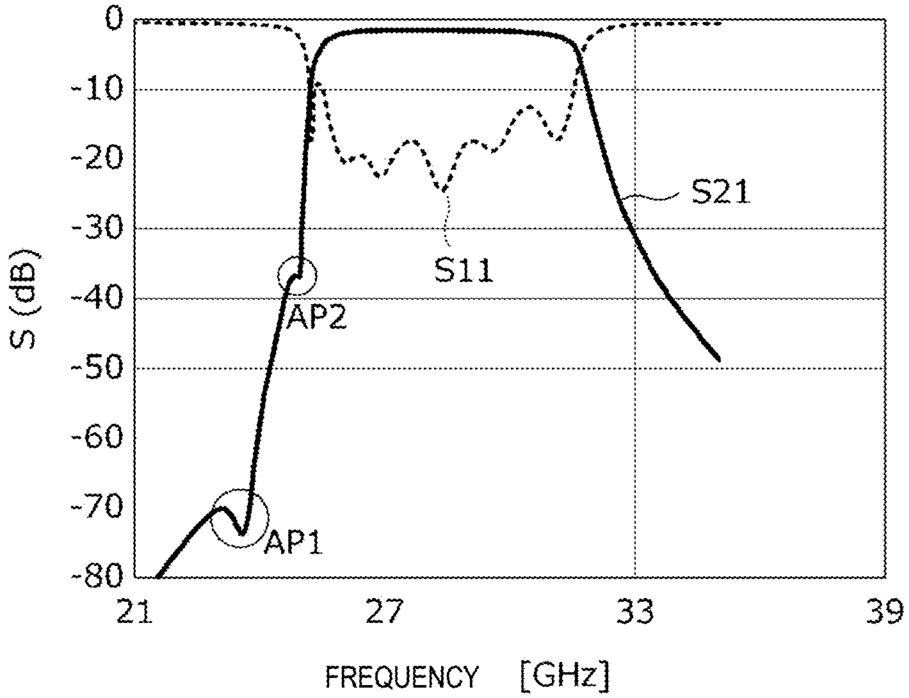
FIG. 20 is a graph showing frequency characteristics which are reflection characteristics and bandpass characteristics of the dielectric waveguide filter.

FIG. 20 is a graph showing frequency characteristics which are reflection characteristics (i.e., S in dB) and pass band characteristics (i.e., frequency in GHz) of the dielectric waveguide filter 103. In FIG. 20, S11 represents reflection characteristics, and S21 represents pass band characteristics. As indicated by FIG. 20, the dielectric waveguide filter 103 of the present preferred embodiment exhibits band pass filter characteristics for the 28 GHz band centered at 28 GHz. Attenuation poles AP1 and AP2 appear on a low-frequency side of a pass band. In the present preferred embodiment, steep attenuation characteristics are obtained on the low-frequency side of the pass band.

Finally, the description of the above-described preferred embodiments is illustrative in all respects and not to be restrictive. Modifications and changes can be appropriately made by those skilled in the art. The scope of the present invention is indicated not by the preferred embodiments but by the claims. Additionally, changes from the preferred embodiments within the scope equivalent to the claims are included in the scope of the present invention.

For example, the preferred embodiments described above have illustrated a dielectric waveguide filter including a plurality of dielectric waveguide resonators. It is also possible to provide a dielectric waveguide filter including a single dielectric waveguide resonator in the same manner.

The preferred embodiments described above have illustrated an example which provides a dielectric waveguide resonator having the TE101 mode as a dominant mode. For example, a high-order resonant mode, such as the TE201 mode or the TE102 mode, may be used.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A dielectric waveguide resonator comprising:
- a dielectric plate including a first principal surface and a second principal surface facing each other and a side surface connecting an outer edge of the first principal surface and an outer edge of the second principal surface;
- a first surface conductor at the first principal surface;
- a second surface conductor at the second principal surface;
- a connection conductor inside the dielectric plate and connecting the first surface conductor and the second surface conductor; and
- an internal conductor which extends in a perpendicular direction to the first principal surface and is physically isolated from the first surface conductor and the second surface conductor; wherein
- the dielectric waveguide resonator includes a dielectric waveguide resonant space surrounded by the first surface conductor, the second surface conductor, and the connection conductor; and
- the internal conductor overlaps with each of the first and second surface conductors in the perpendicular direction to the first principal surface.

2. The dielectric waveguide resonator according to claim 1, wherein the dielectric plate is a multilayer body including a plurality of dielectric layers, and the internal conductor is a conductor defining an inner layer of the plurality of dielectric layers.

3. The dielectric waveguide resonator according to claim 1, wherein the connection conductor is a conductor film at the side surface of the dielectric plate or a through via conductor which extends through the dielectric plate.

4. The dielectric waveguide resonator according to claim 1, wherein a space is provided inside the dielectric plate, and the internal conductor is a conductor that fills the space or a conductor on an inner surface of the space.

5. The dielectric waveguide resonator according to claim 1, wherein the internal conductor is a columnar or tubular conductor.

6. The dielectric waveguide resonator according to claim 1, wherein the internal conductor includes at least one of a planar conductor which faces the first surface conductor in parallel and a planar conductor which faces the second surface conductor in parallel.

7. The dielectric waveguide resonator according to claim 1, wherein the internal conductor is located in a middle of the dielectric waveguide resonant space in plan view of the first surface conductor.

8. The dielectric waveguide resonator according to claim 1, wherein a permittivity of a dielectric present in at least one of a region between the first surface conductor and the internal conductor and a region between the second surface conductor and the internal conductor is higher than a permittivity of a dielectric present in a different region.

9. The dielectric waveguide resonator according to claim 1, wherein a main resonant mode in the dielectric waveguide resonant space is a TE mode in which an electric field faces a direction between the first surface conductor and the second surface conductor.

10. The dielectric waveguide resonator according to claim 1, wherein a ratio of a first distance between the internal conductor and the first surface conductor to a second distance between the internal conductor and the second surface conductor is about 0.1 to about 1.0 inclusive.

11. A dielectric waveguide filter comprising:
- a dielectric waveguide resonator including:
  - a dielectric plate including a first principal surface and a second principal surface facing each other and a side surface connecting an outer edge of the first principal surface and an outer edge of the second principal surface;
  - a first surface conductor at the first principal surface;
  - a second surface conductor at the second principal surface; and
  - a connection conductor inside the dielectric plate and connecting the first surface conductor and the second surface conductor; wherein
- the dielectric waveguide filter includes an internal conductor inside the dielectric waveguide resonator, extends in a perpendicular direction to the first principal surface, and is physically isolated from the first surface conductor and the second surface conductor; and
- the internal conductor overlaps with each of the first and second surface conductors in the perpendicular direction to the first principal surface.

12. A dielectric waveguide filter comprising:
- a plurality of dielectric waveguide resonators each including:
  - a dielectric plate including a first principal surface and a second principal surface facing each other and a side surface connecting an outer edge of the first principal surface and an outer edge of the second principal surface;
  - a first surface conductor at the first principal surface;
  - a second surface conductor at the second principal surface; and
  - a connection conductor inside the dielectric plate and connecting the first surface conductor and the second surface conductor; and
- a main coupling portion coupling adjacent dielectric waveguide resonators of the plurality of dielectric waveguide resonators; wherein
- each of one, some, or all of the plurality of dielectric waveguide resonators includes a respective internal conductor inside the corresponding dielectric waveguide resonator, extends in a perpendicular direction to the first principal surface, and is physically isolated from the first surface conductor and the second surface conductor of the corresponding dielectric waveguide resonator; and
- at least one of the respective internal conductors overlaps with each of the first and second surface conductors of the corresponding dielectric waveguide resonator in the perpendicular direction to the first principal surface.

13. The dielectric waveguide filter according to claim 12, wherein the main coupling portion includes a plurality of main coupling portions including an inductive coupling portion and a capacitive coupling portion and includes a portion where the inductive coupling portion and the capacitive coupling portion are alternately and repeatedly arranged along a main signal propagation route.

14. The dielectric waveguide filter according to claim 13, wherein, of the plurality of main coupling portions, a main coupling portion between an input/output resonator of the plurality of dielectric waveguide resonators which inputs and outputs a signal from and to an outside and a second resonator of the plurality of dielectric waveguide resonators which is coupled to the input/output resonator is an inductive coupling portion.

15. The dielectric waveguide filter according to claim 13, wherein
- the plurality of dielectric waveguide resonators are arranged along a first sub coupling portion besides the main coupling portion for signal propagation; and
- the dielectric waveguide filter further includes a second sub coupling portion between adjacent ones of the plurality of dielectric waveguide resonators adjacent along the second sub coupling portion.

16. The dielectric waveguide filter according to claim 15, wherein
- the dielectric waveguide filter includes a first group of dielectric waveguide resonators including three or more dielectric waveguide resonators and a second group of dielectric waveguide resonators including three or more dielectric waveguide resonators, and the main coupling portion is provided between a first end dielectric waveguide resonator at a first end of the first group and a first end dielectric waveguide resonator at a first end of the second group;
- a second end dielectric waveguide resonator at a second end of the first group and a second end dielectric waveguide resonator at a second end of the second group are dielectric waveguide resonators defining I/O portions;
- one of the first and second sub coupling portions is provided between a first middle dielectric waveguide resonator of the first group and a first middle dielectric waveguide resonator of the second group, and one of the first and second sub coupling portions is an inductive sub coupling portion;

at least one of the three or more dielectric waveguide resonators of the first group is located between the first middle dielectric waveguide resonator of the first group and the first end dielectric waveguide resonator of the first group, and at least one of the three or more dielectric waveguide resonators of the second group is located between the first middle dielectric waveguide resonator of the second group and the first end dielectric waveguide resonator of the second group;

the dielectric waveguide filter includes an internal conductor for a trap resonator between a second middle dielectric waveguide resonator of the first group and a second middle dielectric waveguide resonator of the second group;

the second middle dielectric waveguide resonator of the first group is adjacent to the first end dielectric waveguide resonator of the first group, and the second middle dielectric waveguide resonator of the second group is adjacent to the first end dielectric waveguide resonator of the second group; and a distance between the respective internal conductor of the first end dielectric waveguide resonator of the first group and the respective internal conductor of the first end dielectric waveguide resonator of the second group is narrower than a distance between the respective internal conductor of the second middle dielectric waveguide resonator of the first group and the respective internal conductor of the second middle dielectric waveguide resonator of the second group.

17. The dielectric waveguide filter according to claim 16, wherein a distance between the internal conductor of the dielectric waveguide resonator at the first end of the first group and the internal conductor for the trap resonator is equal to a distance between the internal conductor of the dielectric waveguide resonator at the first end of the second group and the internal conductor for the trap resonator.

18. The dielectric waveguide filter according to claim 15, wherein the dielectric waveguide filter includes a first group and a second group, each including three or more dielectric waveguide resonators, and the main coupling portion is provided between a first end dielectric waveguide resonator at a first end of the first group and a first end dielectric waveguide resonator at a first end of the second group;

a second end dielectric waveguide resonator at a second end of the first group and a second end dielectric waveguide resonator at a second end of the second group are dielectric waveguide resonators defining I/O portions;

the dielectric waveguide filter includes an internal conductor for a trap resonator at a position surrounded by the respective internal conductor of the first end dielectric waveguide resonator of the first group, the respective internal conductor of the first end dielectric waveguide resonator of the second group, the respective internal conductor of a first middle dielectric waveguide resonator of the first group, and the respective internal conductor of a first middle dielectric waveguide resonator of the second group;

the first middle dielectric waveguide resonator of the first group is adjacent to the first end dielectric waveguide resonator of the first group, and the first middle dielectric waveguide resonator of the second group is adjacent to first end dielectric waveguide resonator of the second group; and a distance between the respective internal conductor of the first end dielectric waveguide resonator of the first group and the respective internal conductor of the first end dielectric waveguide resonator of the second group is narrower than a distance between the respective internal conductor of the first middle dielectric waveguide resonator of the first group and the respective internal conductor of the first middle dielectric waveguide resonator of the second group.

* * * * *